(12) United States Patent
Schurman

(10) Patent No.: US 8,135,353 B1
(45) Date of Patent: Mar. 13, 2012

(54) SYSTEM AND METHOD FOR TESTING EMERGENCY DISPATCH SYSTEMS

(76) Inventor: David B. Schurman, Albany, NH (US)

( * ) Notice: Subject to any disclaimer, the term of this patent is extended or adjusted under 35 U.S.C. 154(b) by 434 days.

(21) Appl. No.: 12/383,033

(22) Filed: Mar. 19, 2009

Related U.S. Application Data

(60) Provisional application No. 61/070,228, filed on Mar. 20, 2008.

(51) Int. Cl.
*H04B 17/00* (2006.01)
(52) U.S. Cl. .................................................. 455/67.11
(58) Field of Classification Search .................. None
See application file for complete search history.

(56) References Cited

U.S. PATENT DOCUMENTS

| | | | |
|---|---|---|---|
| 6,792,080 B1 * | 9/2004 | Imperato et al. | 379/29.02 |
| 2006/0242306 A1 * | 10/2006 | Boro et al. | 709/227 |

* cited by examiner

*Primary Examiner* — Lincoln Donovan
*Assistant Examiner* — Sibin Chen
(74) *Attorney, Agent, or Firm* — Michael J. Persson; Catherine E. Napjus; Lawson & Persson, PC

(57) ABSTRACT

A system and method for testing and monitoring all critical operational aspects of a conventional, non-trunked, radio communications base radio or repeater system and alerting the dispatcher when a communication failure or error occurs. The system includes a monitor radio, a dispatch display unit, a communications link from the dispatch center to a remote base station, and a master control unit that is in communication with the monitor radio, the dispatch display unit, and an existing dispatch console.

20 Claims, 18 Drawing Sheets

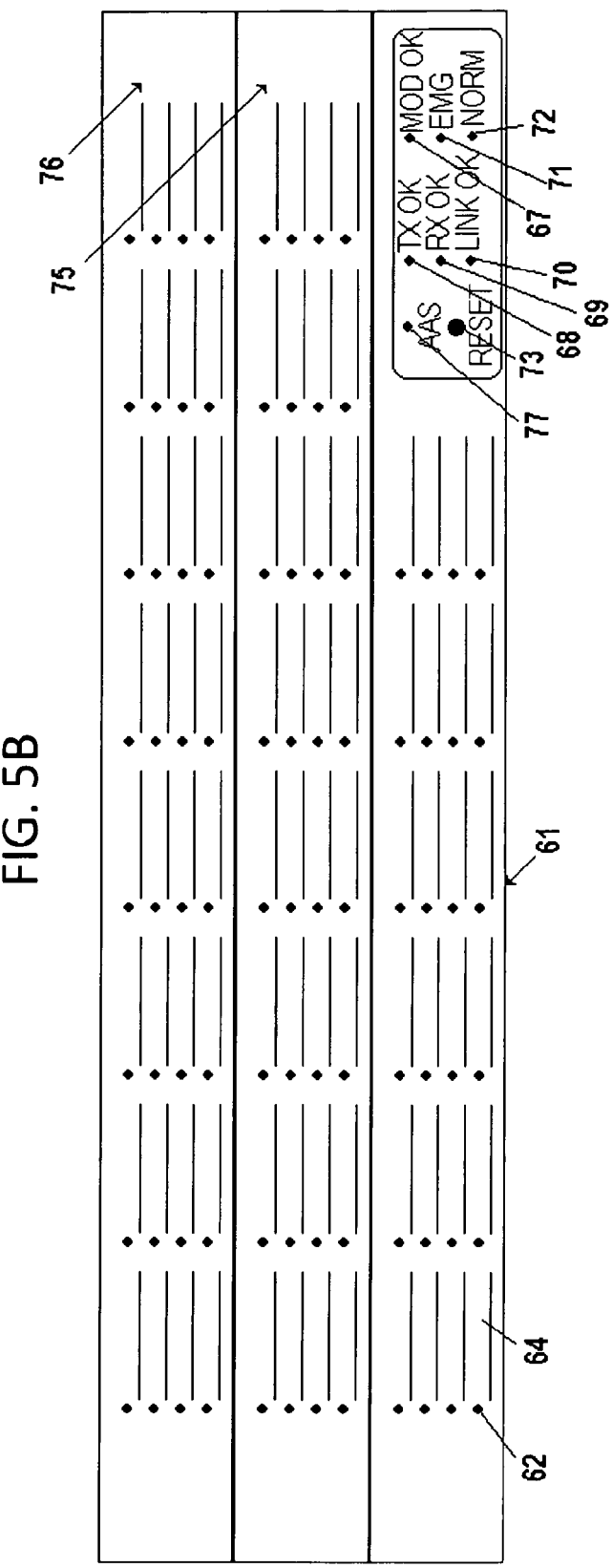
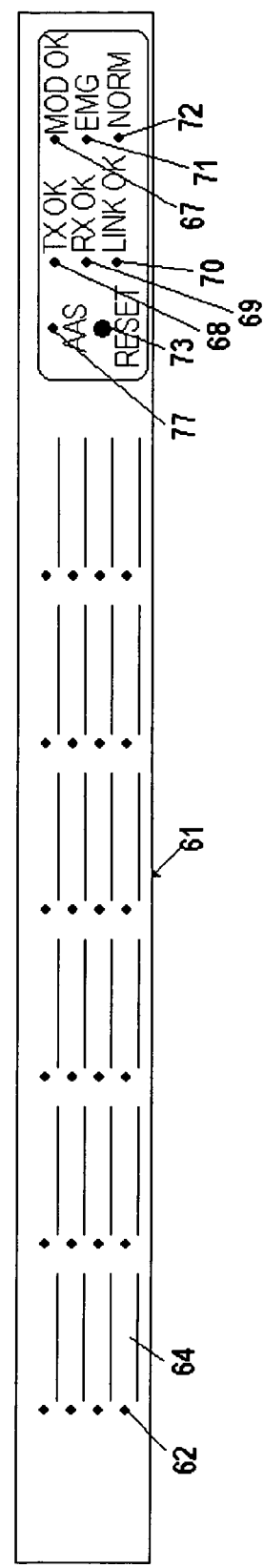
FIG. 5B
FIG. 5A

FIG. 13

SYSTEM AND METHOD FOR TESTING EMERGENCY DISPATCH SYSTEMS

CLAIM OF PRIORITY

This application claims the benefit of priority of U.S. Provisional Patent Application Ser. No. 61/070,228, filed Mar. 20, 2008.

FIELD OF THE INVENTION

The present invention relates to systems for testing and monitoring radio communications systems and, in particular to systems for testing and monitoring conventional, non-trunked, base radio or repeater type communications systems used by emergency services organizations.

BACKGROUND OF THE INVENTION

Emergency services professionals, such as firefighters, police officers, EMT's and others, are commonly summoned into action by a radio communication transmitted from a central dispatch center. When an emergency arises, the call center will transmit a preselected tone sequence (hereafter referred to as "a tone") over the airwaves, which are followed by detailed information regarding the nature of the emergency. The transmitted tones and information are received by the desired professionals, who will then contact the dispatch center to confirm their receipt of the transmission and will then respond to the emergency. This contact is often the only way that the dispatch center will know that the information has been successfully transmitted.

Because the difference of even a few minutes in responding to an emergency communication can determine whether a person is saved or dies, an unknown failure of the dispatch system can truly result in a life or death situation. When an emergency call is dispatched over an unmonitored system, the dispatchers have no indication that the system has failed and the call was not transmitted until they realize that an abnormally long period of time has elapsed without hearing back from the emergency responders. In a busy dispatch center they may not become aware of the failure for quite some time and the consequences can be very serious.

In addition to absolute failures to transmit, it is also possible for a dispatch center to accidentally alert the wrong department without knowing it. When this happens, the dispatch center must wait until the wrong department contacts the center before reinitiating the process for the correct fire department. This can also result in a serious delay in the response of the correct emergency service.

Because of the importance of the dispatch radio system to the safety of those in the coverage area of the dispatch center, an unmonitored fire dispatch radio system can adversely affect the ISO (Insurances Services Office) rating of the department, which can increase the homeowners' insurance rates in the coverage area.

Many larger dispatch centers and emergency departments use sophisticated trunked dispatch systems, which operate digitally and often have internal controls that monitor the system and ensure that it is functioning properly. Unfortunately, the high cost of trunked systems means that a very large number of dispatch centers still utilize non-trunked analog radio systems, and there are currently no commercially available products for monitoring the integrity of these systems.

Therefore, there is a need for a system that will monitor all critical operational aspects of a conventional, non-trunked, analog, radio communications base radio or repeater system and to alert the proper personal when a failure occurs, and that will monitor the paging tones that are transmitted when a department is alerted and to give a visual indication of which department was alerted so the dispatchers can verify that the proper department was paged.

SUMMARY OF THE INVENTION

The present invention is a system and method for testing and monitoring all critical operational aspects of a conventional, non-trunked, radio communications base radio or repeater system and alerting the dispatcher when a communication failure or error occurs, and a dispatch monitoring and display device that alerts a dispatcher to confirm that a communication has been properly transmitted.

In its most basic form, the system of the present invention includes a monitor radio, a dispatch display unit, a communications link from the dispatch center to a remote base station, and a master control unit (MCU) that is in communication with the monitor radio, the dispatch display unit, and an existing dispatch console. The MCU preferably includes a microprocessor, a memory and a computer program product stored in memory that controls both the testing and monitoring functions of the system.

The computer program product of the MCU includes code that initiates periodic system tests. When performing a base station transmission test, the MCU sends a predetermined test tone through the communications link to the remote base station. The remote base station then broadcasts the test tone and, if the remote base station properly broadcasts the tone, it is received by the monitor radio. The monitor radio simultaneously receives the tone and communicates this tone back to the MCU, which confirms that the test tone has been received and sends a signal to the dispatch display unit indicating that the system is working properly. If the monitor radio does not receive the test tone and communicate it back to the MCU within a predetermined period of time, the MCU will initiate one or more additional tests. In the event that the signal is still not received, it will send a signal to the dispatch display unit indicating that that system is not working properly.

The preferred embodiment of the system also performs a base station reception test. When performing a base station reception test, the MCU sends a predetermined test tone to the monitor radio, which transmits the signal to the base station. The base station receives this tone and simultaneously transmits the tone through the communications link to the dispatch center, where it is received by the MCU. The MCU confirms that the test tone has been received by the base station and sends a signal to the dispatch display unit indicated that the system is working properly. If the base station does not receive the test tone and communicate it back to the MCU within a predetermined period of time, the MCU will initiate one or more additional tests. In the event that the signal is still not received, it will send a signal to the dispatch display unit indicating that that system is not working properly. It is preferred that the base station transmission test be initiated before the base station reception test. However, it is noted that, during each test, the tone is transmitted and received substantially simultaneously.

In addition to performing periodic tests, the system also monitors all outgoing transmissions to ensure that they are properly transmitted. In operation, the existing dispatch console will send a tone corresponding to a particular emergency responder to the base station in the conventional manner. This tone will then be broadcast by the base station and received by the monitor radio. The monitor radio then communicates this tone back to the MCU, which receives the tone and decodes the tone using the software program to determine the emergency responder to which the tone corresponds. The MCU then sends a signal to the dispatch display unit, which displays information showing that the tone has been transmitted and identifies the emergency responder to which the tone corresponds.

In the preferred embodiment of the system, the MCU plays a more active role in the monitoring of outgoing transmissions. In this preferred system, the existing dispatch console will send a tone corresponding to a particular emergency responder to the base station in the conventional manner. However, the preferred MCU monitors communications through the communications link and recognizes when a push to talk (PTT) command is made by the dispatcher. Once a PTT initiate command is recognized, the MCU will wait for the monitor radio to send a signal indicating that a tone or voice signal is transmitted and, if a signal is received, will measure the power level of the received signal. If no tone or voice is received by the monitor radio before a PTT terminate command, or if the power level of the signal is below a predetermined power threshold, the MCU will send a signal to the dispatch display unit that there is a system failure. The dispatch display unit will then produce and audible and/or visual alarm to inform the dispatcher that the transmission has failed.

The preferred embodiment of the MCU monitors all communications over the communications system and recognizes when tone or voice traffic occurs. If there is tone or voice traffic over the system at the time when a system test is to be conducted, the MCU will recognize this fact and automatically delay the performance of the test until a time when there is no traffic over the system. The MCU also monitors the push to talk (PTT) signals and, in the event that a system test is being conducted and a dispatcher tries to initiate a transmission at the same time, the MCU will recognize that a PTT signal has been sent and will immediately stop the test. In the preferred embodiment, the MCU includes mechanical relays that automatically terminate the test once a PTT signal is sent without waiting for a termination signal from the MCU's microprocessor. This results in a near instantaneous switching-off of the test. A mechanical relay is preferred due to its adaptability to a number of different types of PTT systems. However, it is recognized that an electronic relay may also be used.

The preferred embodiment of the system also includes a remote site unit (RSU) that is located at the site of the base station and is in communication with the base station. The preferred RSU includes its own microprocessor, memory and computer program product and is also in communication with the emergency backup power system at the remote base station site. The preferred RSU monitors the power status of the base station and sends a signal to the MCU whenever a change in power occurs; i.e. normal power is interrupted and emergency power is in use, both normal and emergency power are on, etc. The MCU then sends a signal to the dispatch display unit to produce an audible and/or visual alarm to inform the dispatcher that a change in power has occurred at the base station.

The preferred RSU is also in communication with an intrusion alarm at the remote base station and sends a signal to the MCU when the alarm has been triggered. The MCU then sends a signal to the dispatch display unit to produce an audible and/or visual alarm to inform the dispatcher that an intrusion alarm has been triggered at the base station.

The preferred RSU is also used to test the communications link between the dispatch center and the remote base station. In such embodiments, if a system test is performed and it is found that there is a failure with both the transmission and reception at the base station, the MCU will transmit a tone through the communications link to the RSU. The RSU will receive the tone, identify it as a communications link test tone, and send a response tone back to the MCU. If the MCU receives the response tone back it will send a signal to the dispatch display unit indicating that the link is operational. If it does not receive a response tone back, the MCU will send a signal to the dispatch display unit indicating that the link is not operational. In some embodiments of the system, the communications link is a hard-wired link, such as a common telephone line, a CATS line, coaxial cable, or fiber optic cable, which runs between the dispatch center and the remote base station. In other embodiments, the link is a radio or microwave link that includes separate link transceivers at the dispatch center and the remote base. In still other embodiments, the communications system is a repeater system and the communications link is a control station that has a dispatch transmitter that is in communication with the console and MCU and wirelessly transmits signals to the base station. In embodiments of the system of the present invention used with repeater systems, it is preferred that a base station monitor radio be included at the remote base station. This base station monitor radio will be in communication with the RSU and will be used to determine whether a problem is with transmission from the dispatch center or from base station. In such embodiment, the RSU will be more sophisticated than in systems used with hard links and will include a similar computer program to that included with the MCU.

In some communications systems, the dispatch center is linked to and communicates with a number of remote base stations. In these cases, the MCU may include multiple inputs from the dispatch console, with each corresponding to separate remote base station or the MCU may include software that allows the MCU to determine which remote base station a sent a signal.

In some communications systems, the dispatch center is not located within the transmission range of all remote base stations to which the dispatch center is linked. In these systems, it is preferred that a remote monitor radio be mounted at a location remote from the dispatch center that is within the transmission range of the remote base station and placed in communication with the MCU either via the communications link between the dispatch center and the remote base, or via a separate communications link. In some embodiments, the base station monitor radio disposed at the remote base station is used as the remote monitor radio. In other embodiments, the remote monitor radio is disposed at a location along the communications link and taps into the communications link with the dispatch center. In still others, it is located at another location and includes its own dedicated link with the dispatch center. In systems in which one or more remote base stations are within transmission range of the dispatch center and others are not, multiple remote monitor radios may be in communication with the MCU.

The preferred embodiment of the dispatch display unit of the system of the present invention includes a plurality of light emitting diodes (LED's) that display operational conditions of the communications system being monitored, and an audible alarm. In other embodiments, the display is an LCD or other visual display. In the preferred embodiment of the dispatch display unit, a first set of LED's corresponds to the individual emergency response departments to which signals may be sent and are lit when the system is in operational mode. In operation, these LED's are lit once a tone for a particular department has been received by the monitor radio, is decoded by the MCU, and a signal is sent from the MCU to the dispatch display unit to light that LED. In the preferred embodiment, the LED will remain lit for a predetermined period of time, preferably five to fifteen minutes, so that the dispatcher can readily determine whether the proper tone has been broadcast, after which it will go out. A second set of LED's relate to the tested status of the system and include LED's corresponding to whether the base station is transmitting properly, whether the base station is receiving properly, whether the link between the MCU and the remote base station is operational, whether the emergency power generator is operating, whether the base station is operating using normal power, and whether the switch controlling the emergency power generator is operation. When one of these LED's is lit to designate a fault condition, the audible alarm will also sound to alert the dispatcher of a problem. The audible alarm may be silenced be depressing a reset button on the DDU. In the preferred embodiment, depressing the reset button will initiate a new test of the system. However, in other embodiments a new system test may only be initiated by depressing the reset button on the DDU a second time.

The present invention also encompasses both the overall method performed by the system as well as the method of testing the communication system that is performed by the testing and monitoring system of the present invention. In its most basic form, the method includes the steps of determining that it is time to initiate a system test, sending a signal to broadcast a predetermined test tone from a dispatch location to a remote base station, broadcasting the test tone, receiving the tone back at the dispatch location, confirming whether the test tone has been received, and providing an indication of the status of the system.

The preferred method is performed by a computer program product stored in the memory of the MCU. The computer program product performs a number of unique steps, which are intended to be a part of the method. These steps include the steps required to isolate the link during the test such that the test is not audible to the dispatcher, switching channels of the remote base to a channel that does not transmit a PL tone or code and does not require a PL tone or code for receiving, the test is not audible to radios that are in PL tone or code mode, and the steps required to recognize tones and series of tones.

The present invention also encompasses a dispatch monitoring and display device that integrates certain features of the MCU and dispatch display unit, but is used solely for monitoring the transmission of signals to emergency responders and alerting a dispatcher to confirm that a communication has been properly transmitted. In its most basic form, the dispatch monitoring and display device includes a communications port for receiving signals from a monitor radio, a microprocessor, a memory, a computer program product stored in memory that controls the monitoring and display functions of the device, and a display that displays information showing that the tone has been transmitted and identifies the emergency responder to which the tone corresponds. In operation, the dispatch center will send a tone corresponding to a particular emergency responder to the base station in the conventional manner. This tone will then be broadcast by the base station and received by the monitor radio. The monitor radio then communicates this tone through the communications port to the dispatch monitoring and display device, which receives the tone, decodes the tone using the software program to determine the emergency responder to which the tone corresponds, and displays information showing that the tone has been transmitted and identifies the emergency responder to which the tone corresponds.

In the preferred embodiment, the dispatch monitoring and display device includes its own monitor radio. In such embodiments, the communication port is an internal port that sends signals from the radio portion of the device to the memory and microprocessor.

The preferred dispatch monitoring and display device includes a plurality of LED's that operate in a manner similar to that described above with reference to the dispatch display unit of the system of the present invention. In other embodiments, the display is an LCD or other visual display that shows that the tone has been transmitted and identifies the emergency responder to which the tone corresponds. In still other embodiments, the dispatch monitoring and display device includes an output that allows the information displayed by the device to be transmitted to another computer system for display and/or storage.

Therefore, it is an aspect of the invention to provide a system that will monitor all critical operational aspects of a conventional, non-trunked, radio communications base radio or repeater system and to alert the proper personal when a failure occurs.

It is a further aspect of the invention to provide a system for monitoring the paging tones that are transmitted when a department is alerted and to give a visual indication of which department was alerted so the dispatchers can verify that the proper department was paged.

It is a further aspect of the invention to provide a system for monitoring the status of the normal and emergency power at the base radio or repeater site and to alert the proper personal of any change is status.

It is a further aspect of the invention to provide a system that tests all system components once a failure occurs and to identify and display which components are operational and which are not operational.

It is a further aspect of the invention to provide a system that will automatically terminate a test when a PTT command is initiated by a dispatcher.

It is a further aspect of the invention to provide a system that will perform the periodic system tests without generating sounds that could be potentially annoying to the dispatchers.

It is a further aspect of the invention to provide a system that allows dispatchers to silence an audible alarm and will re-initiate the audible alarm when another fault condition occurs.

These aspects of the invention are not meant to be exclusive and other features, aspects, and advantages of the present invention will be readily apparent to those of ordinary skill in the art when read in conjunction with the following description, appended claims and accompanying drawings.

BRIEF DESCRIPTION OF THE DRAWINGS

FIG. 5A is a front view of the display panel of the dispatch display of one embodiment of the system.

FIG. 5B is a front view of the display panel of the dispatch display of one embodiment of the system attached to two add-on display panels.

FIG. 13 is a flowchart showing the steps performed in connection with entering tone data into the MCU.

DETAILED DESCRIPTION OF THE INVENTION

Figure 1:
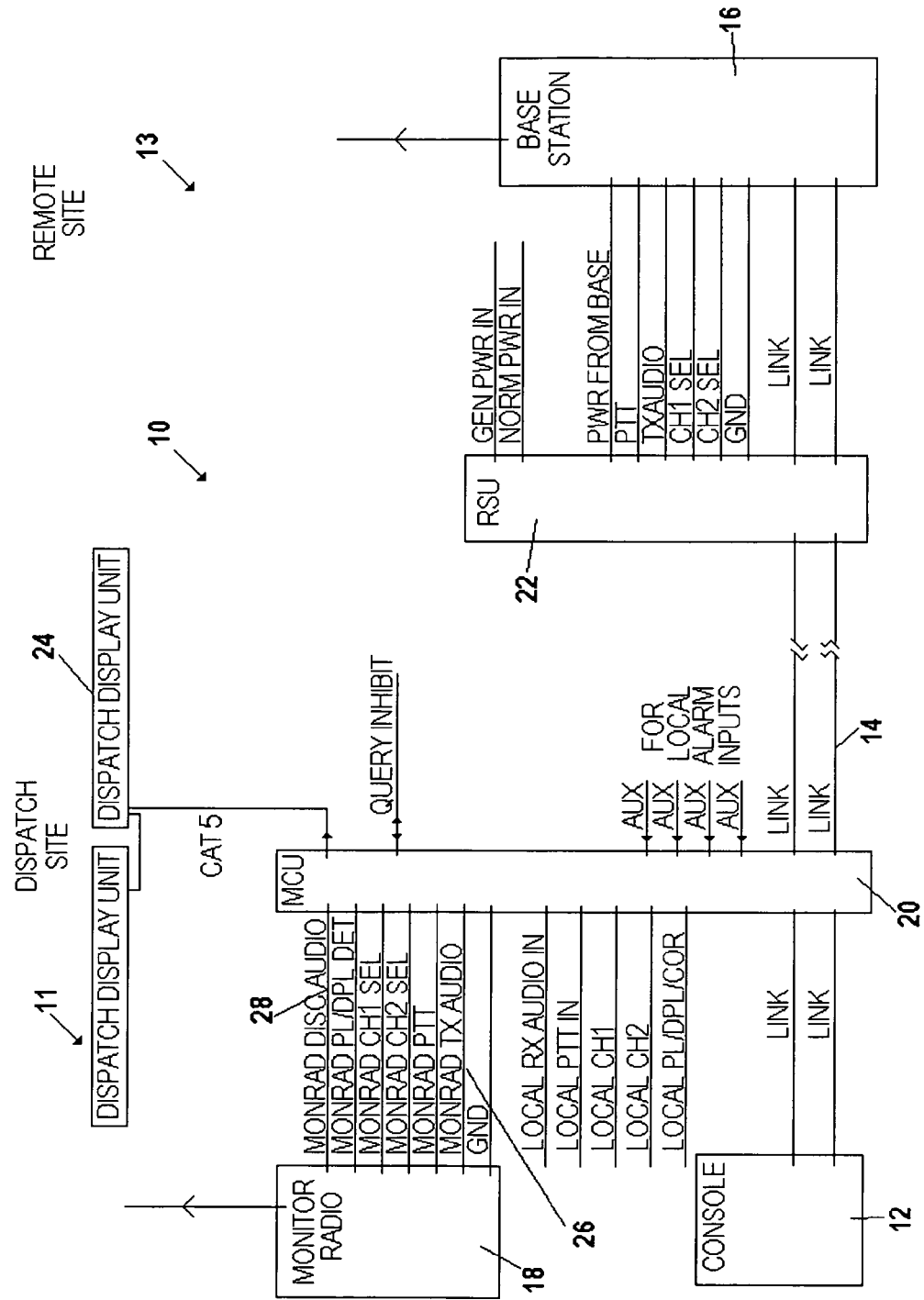
FIG. 1 is a block diagram showing the preferred embodiment of the system of the present invention in which the communications link is a hard-wired link.
Figure 2:
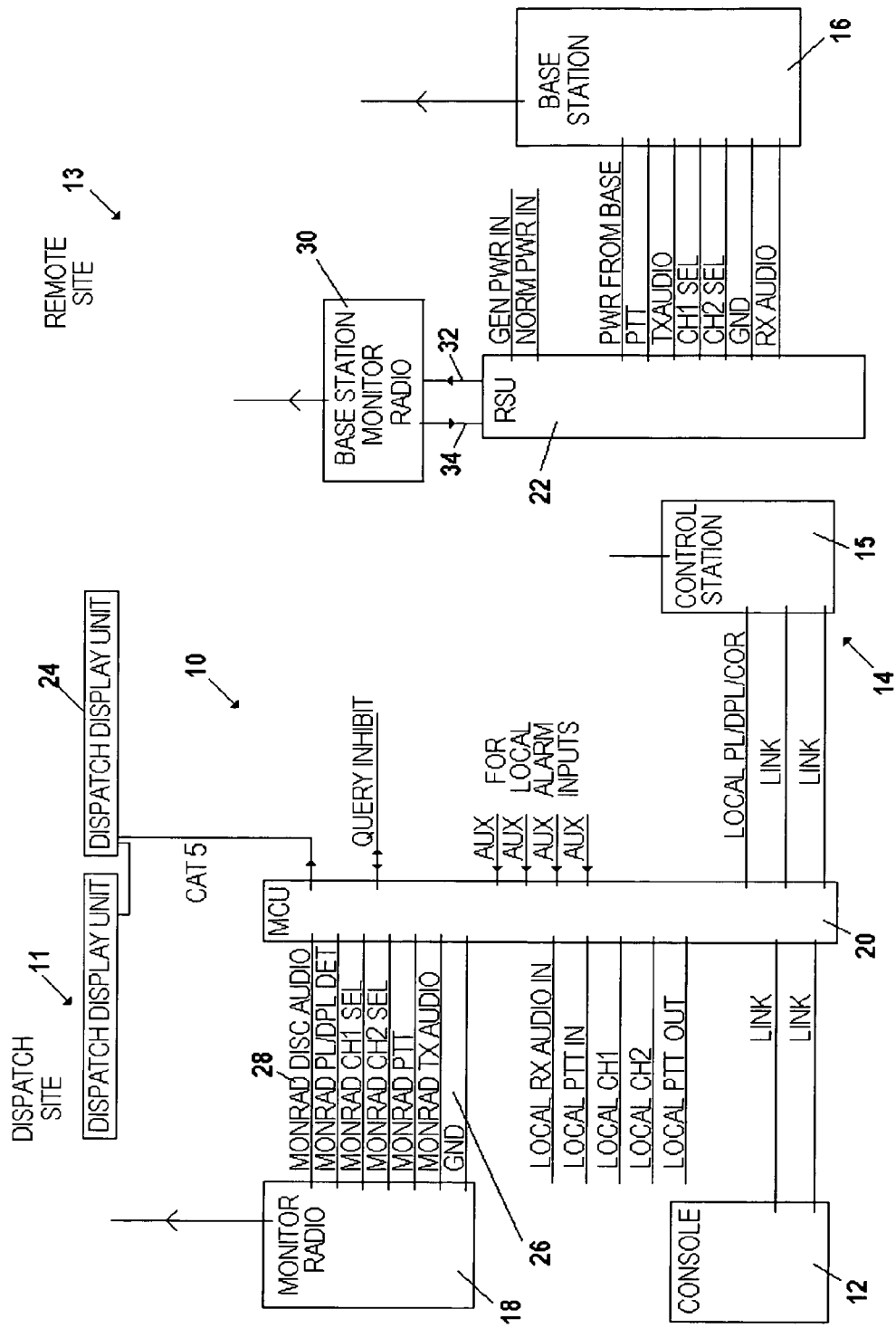
FIG. 2 is a block diagram showing the preferred embodiment of the system of the present invention for use with a repeater system in which the communications link is a wireless control station.

Referring first to FIGS. 1 and 2, block diagrams of preferred embodiments of the system 10 of the present invention are shown. The preferred system 10 is integrated into an existing communication system located at a dispatch site 11 that includes a dispatch console 12 a communications link 14 and a remote base station 16 that is at a remote site 13 and is in communication with the dispatch console via the communications link 14. In FIG. 1, the communications link 14 is a hard-wired link, such as a common telephone line, a CATS line, coaxial cable, or fiber optic cable, which runs between the dispatch console 12 and the remote base station 16. However, in other embodiments, the link is a radio or microwave link that includes separate link transceivers at the dispatch center 11 and the remote base 13. In the embodiment of FIG. 2, the communications system is a repeater system and the communications link 14 is a control station 15 that has a dispatch transmitter that is in communication with the console 12 and MCU 20 and wirelessly transmits signals to the base station 16.

The communication systems shown in FIGS. 1 and 2 are referred to as a non-trunked systems and are commonly used to communicate with a number of different emergency responders. In analog non-trunked systems, each responder or group of responders is assigned a specific series of analog tones that are broadcast before the content of any dispatch communication. The responders' radios are often programmed to listen for the specific tones for that responder and to only receive those communications that relate to the responder. The preferred system 10 of the present invention is specifically adapted for use with such analog systems. However, it is recognized that the system 10 could be readily modified to operate with digital broadcast systems and the invention is not intended to be limited to use with analog systems.

The preferred systems 10 of the present invention include a dispatch monitor radio 18, a dispatch display unit (DDU) 24, a remote base station 16, a master control unit (MCU) 20 that is in communication with dispatch display unit 24 and the communications link 14 from the dispatch console 12 to the remote base station 16, and a remote site unit (RSU) 22 that is in communication with the remote base station 16 and the communications link 14 from the dispatch console 12 to the remote base station 16. As shown in FIG. 2, when the communication system is a repeater system, the preferred system 10 also includes a base station monitor radio 30 that is in communication with the RSU 22 and receives and transmits communications from and to the control station 15.

The dispatch monitor radio 18 is preferably a radio transceiver that will transmit and receive radio signals over the emergency frequency band. The preferred dispatch monitor radio 18 has push to talk (PTT) capability and has at least one input 26 through which communications are received from the MCU 20 and at least one output 28 through which communications are sent to the MCU 20. The preferred monitor radio 18 is a model CM 200 radio manufactured by the Motorola Corporation of Schaumburg, Ill., which is integrated into the MCU 20. However, other embodiments of the system 10 may include other models and types of monitor radios. Further, in still other embodiments, the monitor radio 18 is separate from the MCU 20, or integrated into another device, such as the dispatch display unit 24, that forms a part of the system 10.

Figure 3:
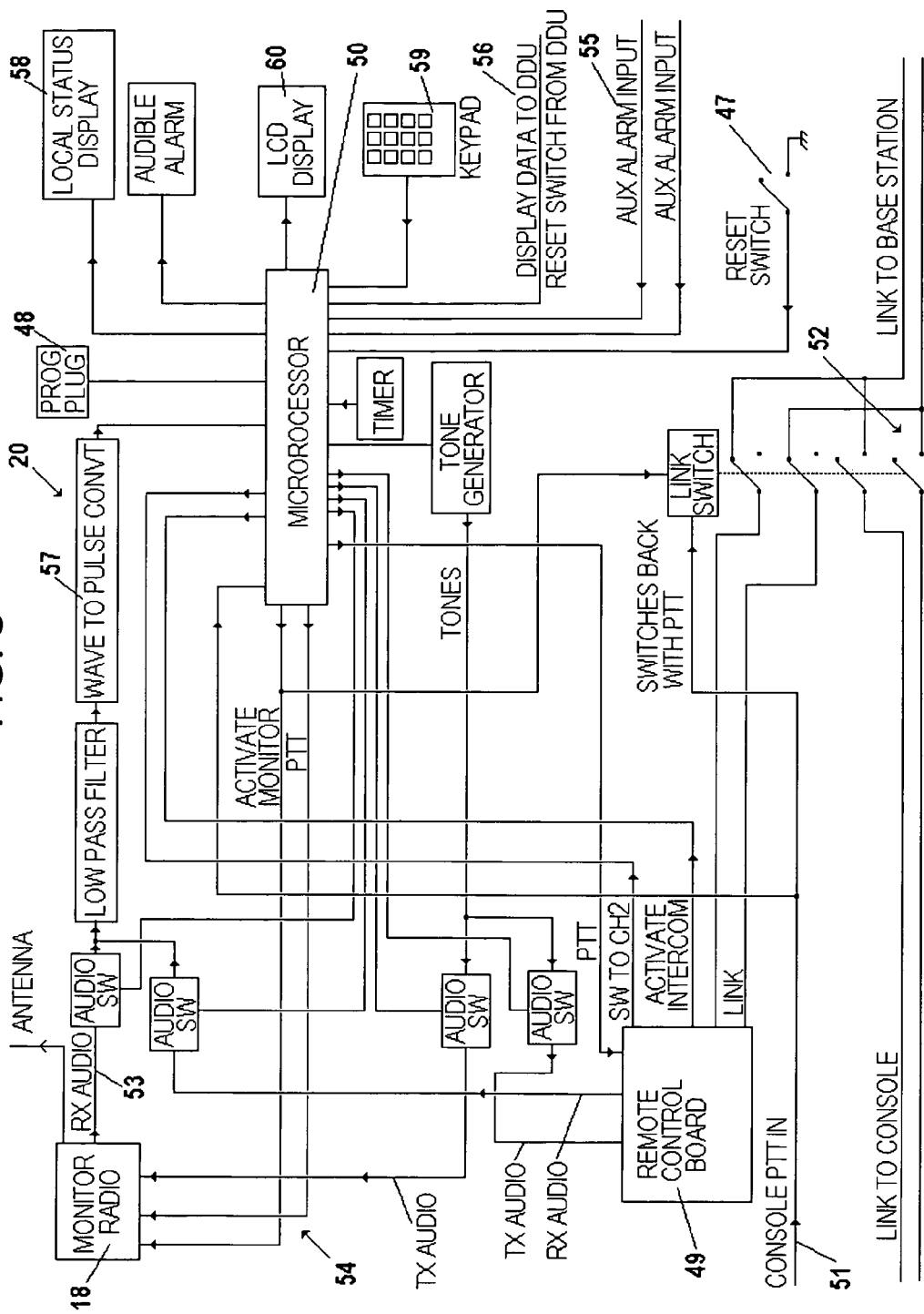
FIG. 3 is a block diagram showing the operation of the MCU.

The MCU 20 is the "brain" of the system and controls all aspects of system operation. As shown in FIG. 3, the preferred MCU 20 includes a microprocessor 50 having an internal memory in which a computer program product is stored. The computer program product is described in detail below and controls both the testing and monitoring functions of the system. The microprocessor 50 is in communication with a timer 57 and a tone generator 58, which are used when the system 10 performs tests. The MCU 20 includes a number of inputs and outputs, including a console PTT input 51 that alerts the MCU 20 when a push to talk command is made by the dispatch console, a communications link input/output 52 that receives signals sent through the link and allows the signals to continue on to the remote base station, a monitor radio input 53 and output 54, an auxiliary alarm input 55, and an output 56 to the DDU 24. The preferred MCU 20 includes a program plug 48, which allows the microprocessor to be reprogrammed in place and also allows a terminal to communicate with the microprocessor. The preferred MCU 20 includes a remote control board 49, which controls the information passing through the link to the base station 16. The remote control board 49 sends out tones to key the base station 16, change the channel, put it in monitor mode etc. It also sends and receives the audio to and from the remote base station 16. Various audio switches route the audio to and from the monitor radio 18, the remote control board 49, the tone generator 58 and the tone decoder in the microprocessor 50.

Figure 12:
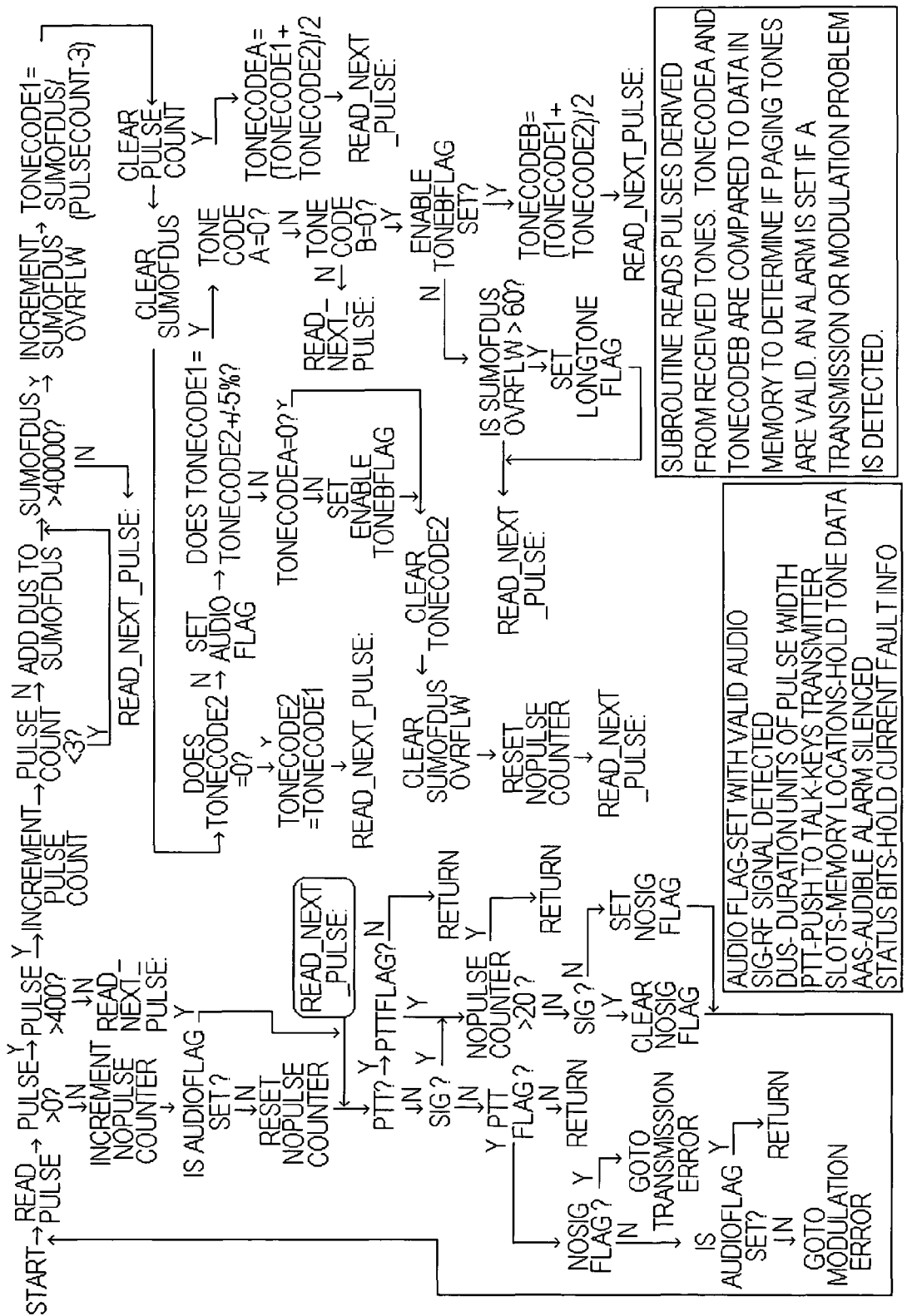
FIG. 12 is a flowchart showing the steps performed by the system in the method of identifying tones and series of tones of the present invention.

The preferred MCU 20 includes a wave to pulse converter 57, which converts the analog tones received from the monitor radio 18 into digital pulses that may be decoded by the microprocessor. The preferred wave to pulse converter 57 is a flip-flop clock input with a Schmitt trigger, which is preferred due to its ability to provide a good pulse output over a wide range of input voltages. The microprocessor 50 reads the width of the pulses to determine the frequency of the tone and the number of pulses. In the preferred MCU 20, the computer program product stored in the memory of the microprocessor 50 includes code following the flowchart of FIG. 12, which reads and processes the pulses received from the wave to pulse converter 57.

Figure 13:
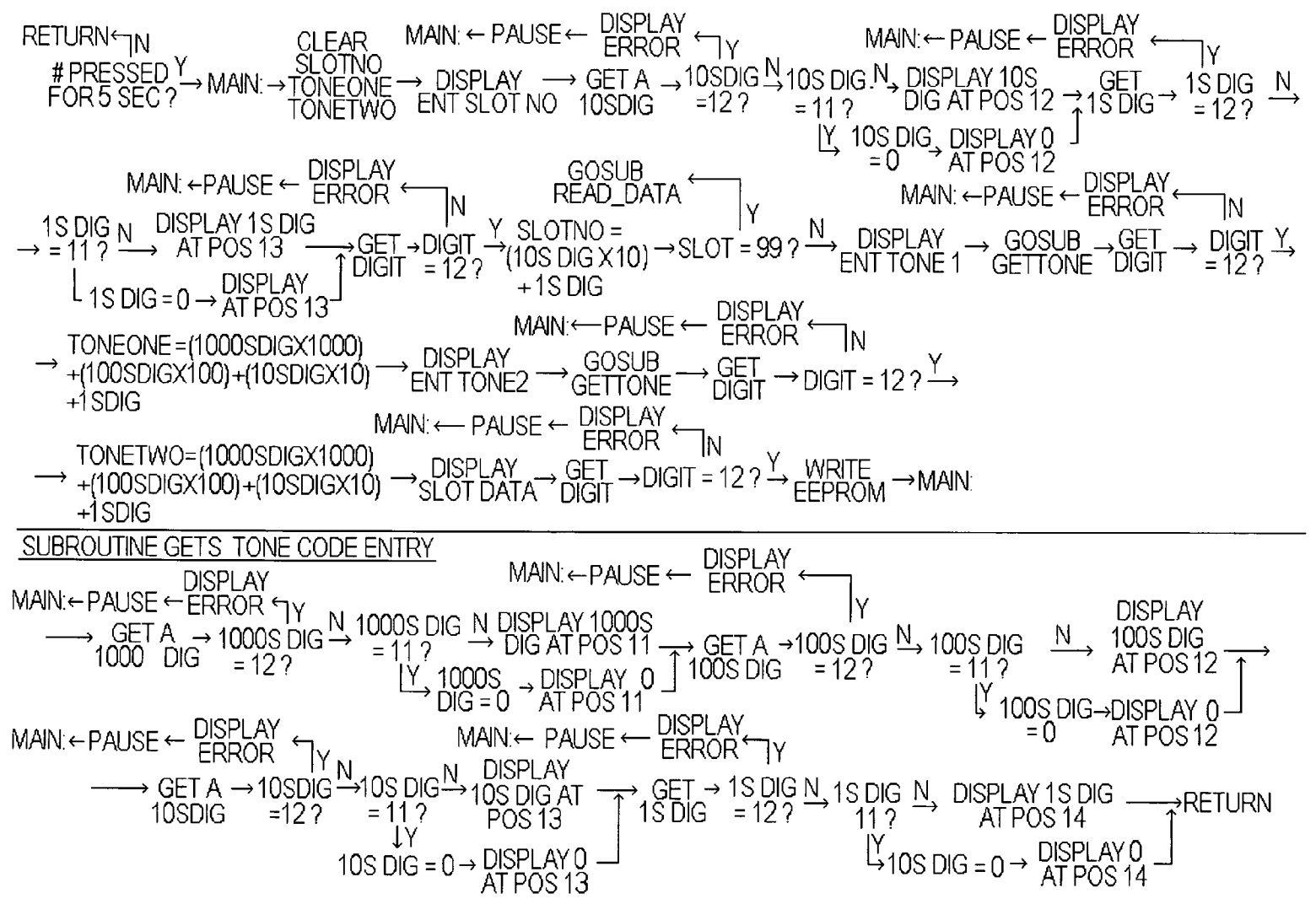

In addition to the operational components of the MCU 20, the preferred MCU 20 includes a number of components that are related to the programming of the MCU 20 and the service of the system by a technician. The preferred MCU 20 includes a reset switch 47 that can reset the microprocessor 50 if the technician gets it hung up. The preferred MCU 20 includes a local status display 58, which duplicates the system status display on the DDU 24 and allows the technician to know the status of the system 10 when working on it. The preferred MCU 20 includes an LCD display 61, which provides information to the technician about paging tones that are entered into the system, time of the next system test, entering various test functions etc. Finally, the preferred MCU 20 includes a keypad 59 that is used to enter paging tone codes for tones that will be decoded and to enter various test functions. It is noted that the computer program product stored in the memory of the microprocessor 50 preferably includes code following the flowchart of FIG. 13, by which the technician may enter paging tone codes for tones that will be decoded and by which these codes will be assigned to specific LED's on the DDU 24.

Figure 4A:
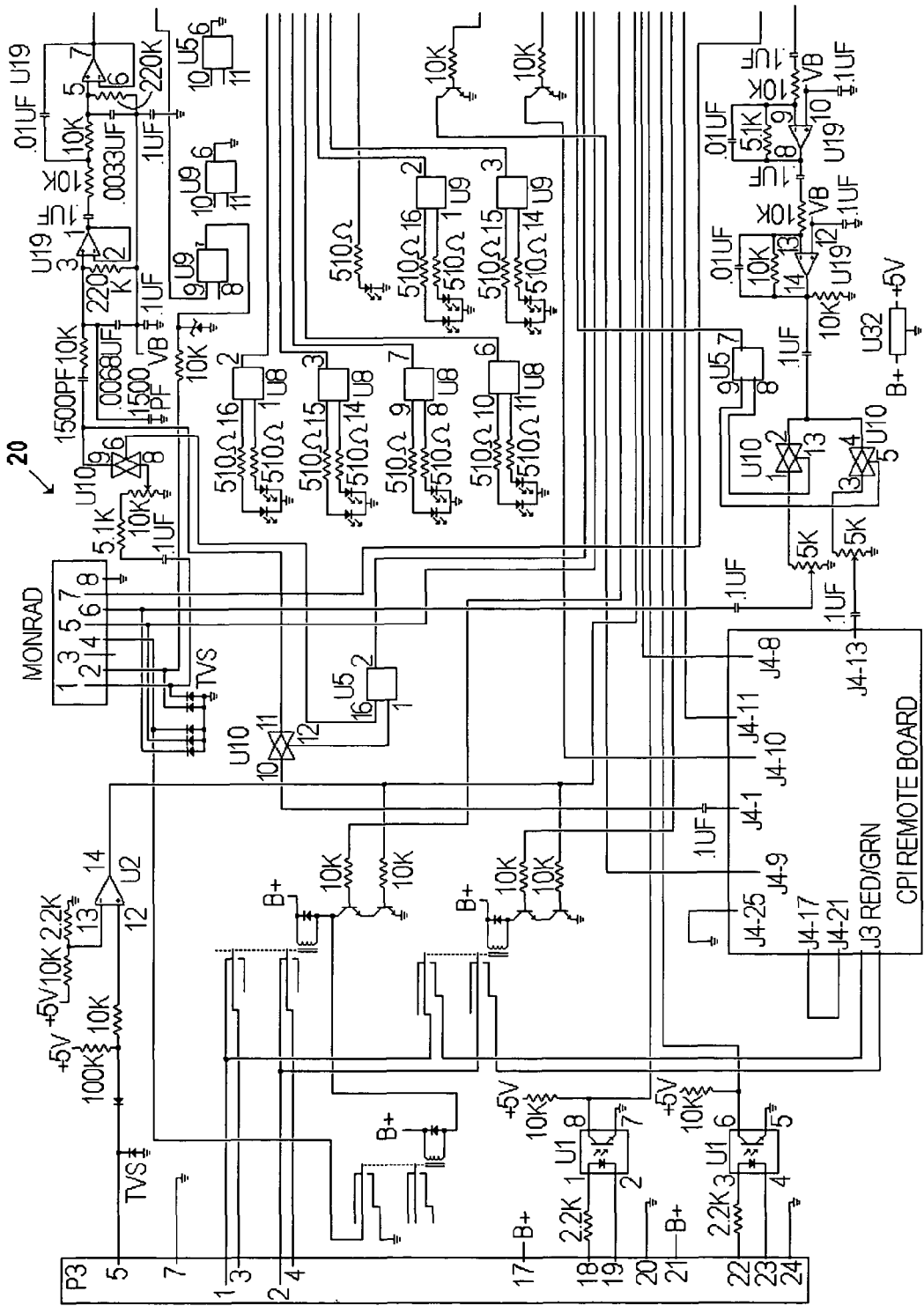
FIG. 4A is a partial wiring schematic showing the left portion of the electrical wiring of the preferred MCU.
Figure 4B:
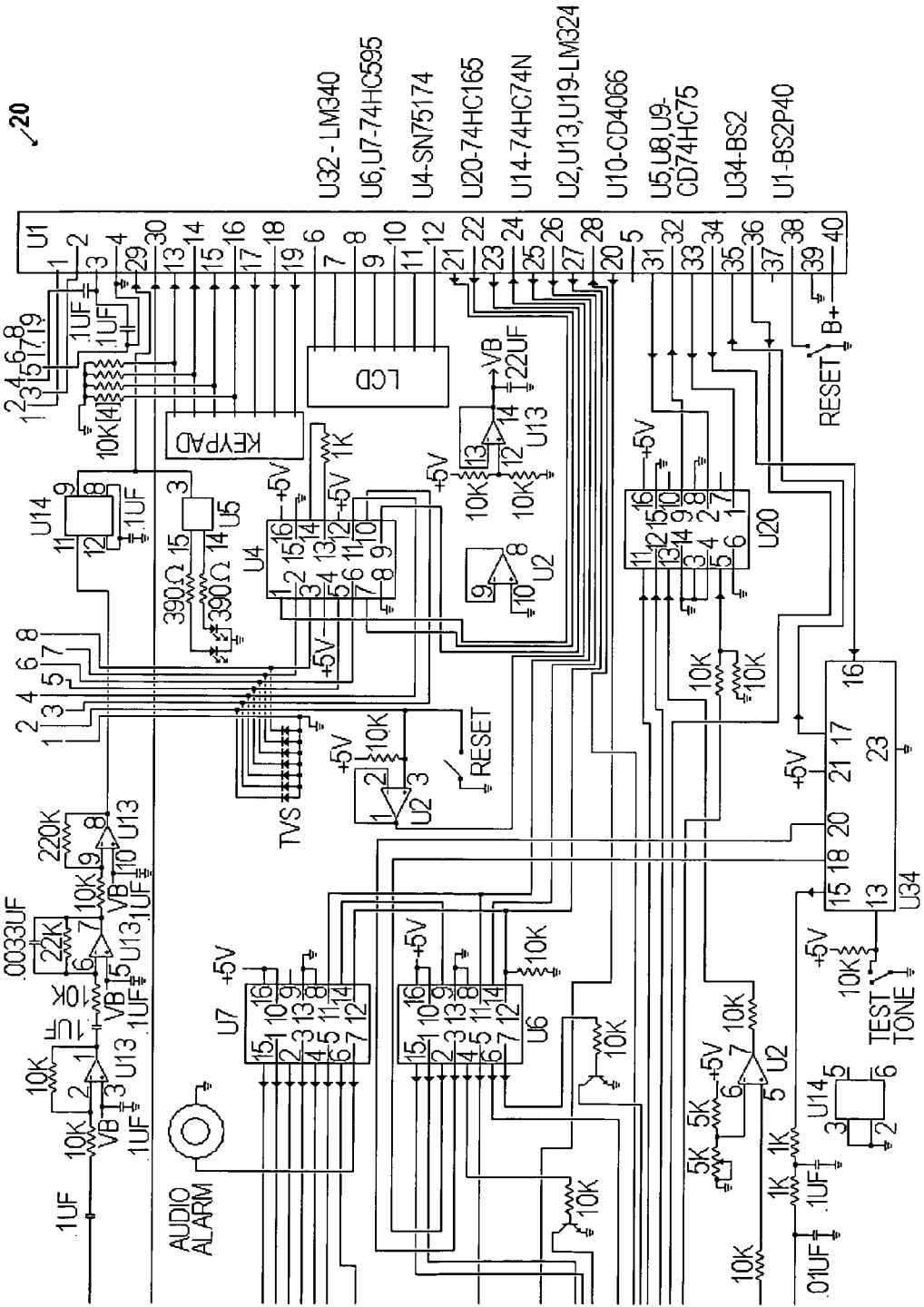
FIG. 4B is a partial wiring schematic showing the right portion of the electrical wiring of the preferred MCU.

An electrical schematic of the preferred MCU 20 is shown in FIGS. 4A and 4B. This schematic would be readily understood by those of skill in the electrical arts and is not described in detail herein.

The DDU 24 is in communication with the MCU 20 and both displays information relating to the operation of the system 10 and sounds alarms when the system 10 is not operating properly. The display panel 61 of the DDU 24 of the one embodiment of the system 10 is shown in FIGS. 5A and 5B. This display panel 61 includes a series of light emitting diodes (LED's) 62 that are adjacent to spaces 24 upon which the specific emergency responders are displayed. In operation, the MCU 20 will decode a tone that has been received by the dispatch monitor radio 18 and transmit a signal to the DDU 24 to illuminate the LED 62 corresponding to the specific emergency responder displayed in the space 64 next to that LED 62. As shown in FIG. 5B, when the system 10 is used by a large number of emergency responders, add-on display panels 75, 76 may be connected to main display panel 61 of the DDU 24 in order to accommodate all responders.

The display 61 of the DDU 24 also includes a dispatch circuit integrity status display 66, which includes a plurality of LED's 67, 68, 69, 70, 71, 72 that relate to the integrity of the dispatch circuit. In the preferred DDU 24, these LED's 67, 68, 69, 70, 71, 72 are dual color LED's, which can be switched between a green color, representing proper operation, and a red color, representing a fault in operation. In the DDU 24 of FIGS. 5A and 5B, these LED's include a modulation normal LED 67, which will be illuminated in a green color if the tones are being modulated in a normal manner, a transmitter operational LED 68, which will be illuminated in a green color if the remote base station is transmitting signals properly, a receiver operational LED 69, which will be illuminated in a green color if the remote base station is receiving signals properly, a link operational LED 70, which will be illuminated in a green color if the communications link is fully operational, an emergency power off LED 71, which will be illuminated in a green color if the emergency power system at the remote base station is not in operation, and a normal power on LED 72, which will be illuminated in a green color if the remote base station is powered by its normal power source. However, it is recognized that these LED may be different, and additional status display LED may be included, in different embodiments. For example, embodiments that work with battery powered remote base stations may replace the emergency power off LED 71 and the normal power on LED 72 with a battery charge low LED and a battery charge high LED. Similarly, embodiments in which an intrusion alarm is installed at the remote base station may include an additional intrusion alarm LED. Therefore, the integrity status display 66 of FIGS. 5A and 5B should be viewed as being illustrative of the types of status displays that may be utilized, an not as the sole type of status display.

In the event that integrity of the system 10 is compromised in any way, the appropriate LED 67, 68, 69, 70, 71, 72 will be illuminated with a red color and an audible alarm will sound. Once alerted to the integrity issue, the dispatcher may press a reset button 73 on the DDU 24, which will silence the audible alarm and illuminate an audible alarm silenced LED 77. The reset button 73 will not change the status of the LED's 67, 68, 69, 70, 71, 72, which are controlled by signals from the MCU 20. However, in the preferred system 10, pressing the reset button 73 will cause a new system test to be performed and, if the system 10 is fully operational, all integrity LED's 7, 68, 69, 70, 71, 72 will be illuminated in green. In other systems, an additional system test may be initiated by pressing the reset button 73 a second time.

Figure 6:
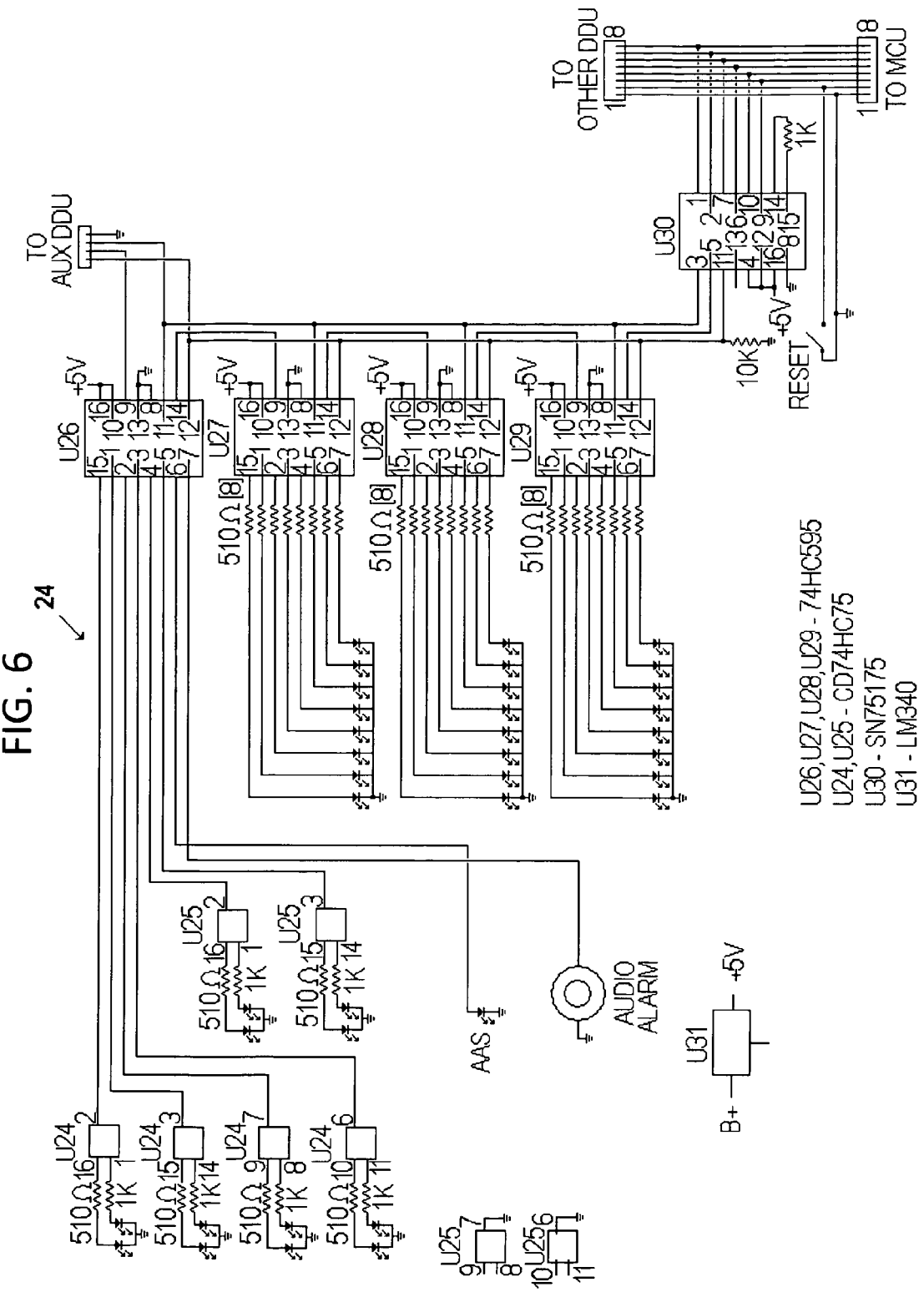
FIG. 6 is a wiring schematic showing the electrical wiring of the of the dispatch display of the preferred system.

An electrical schematic of the preferred DDU 24 is shown in FIG. 6. This schematic would be readily understood by those of skill in the electrical arts and is not described in detail herein. It is noted that, although the preferred DDU 24 utilizes LED's to display information, other embodiments of the DDU 24 may include an LCD or other visual display that displays text indicating that the tone has been transmitted and identifies the emergency responder to whom the tone corresponds. In still other embodiments, the DDU 24 and/or MCU 20 includes an output that allows the information displayed by the device to be transmitted to another computer system for display and/or storage.

Figure 7:
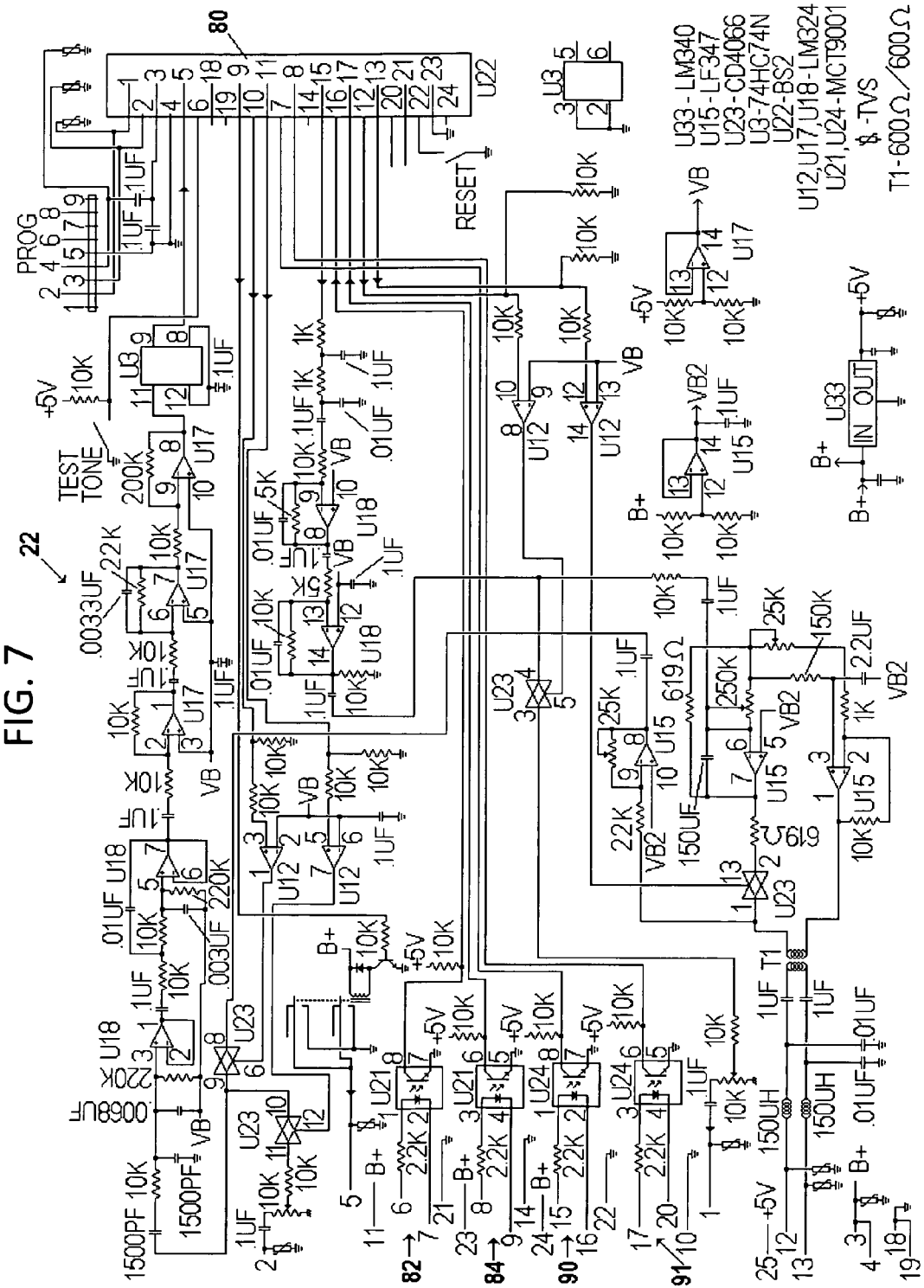
FIG. 7 is a wiring schematic showing the electrical wiring of the preferred RSU.
Figure 8:
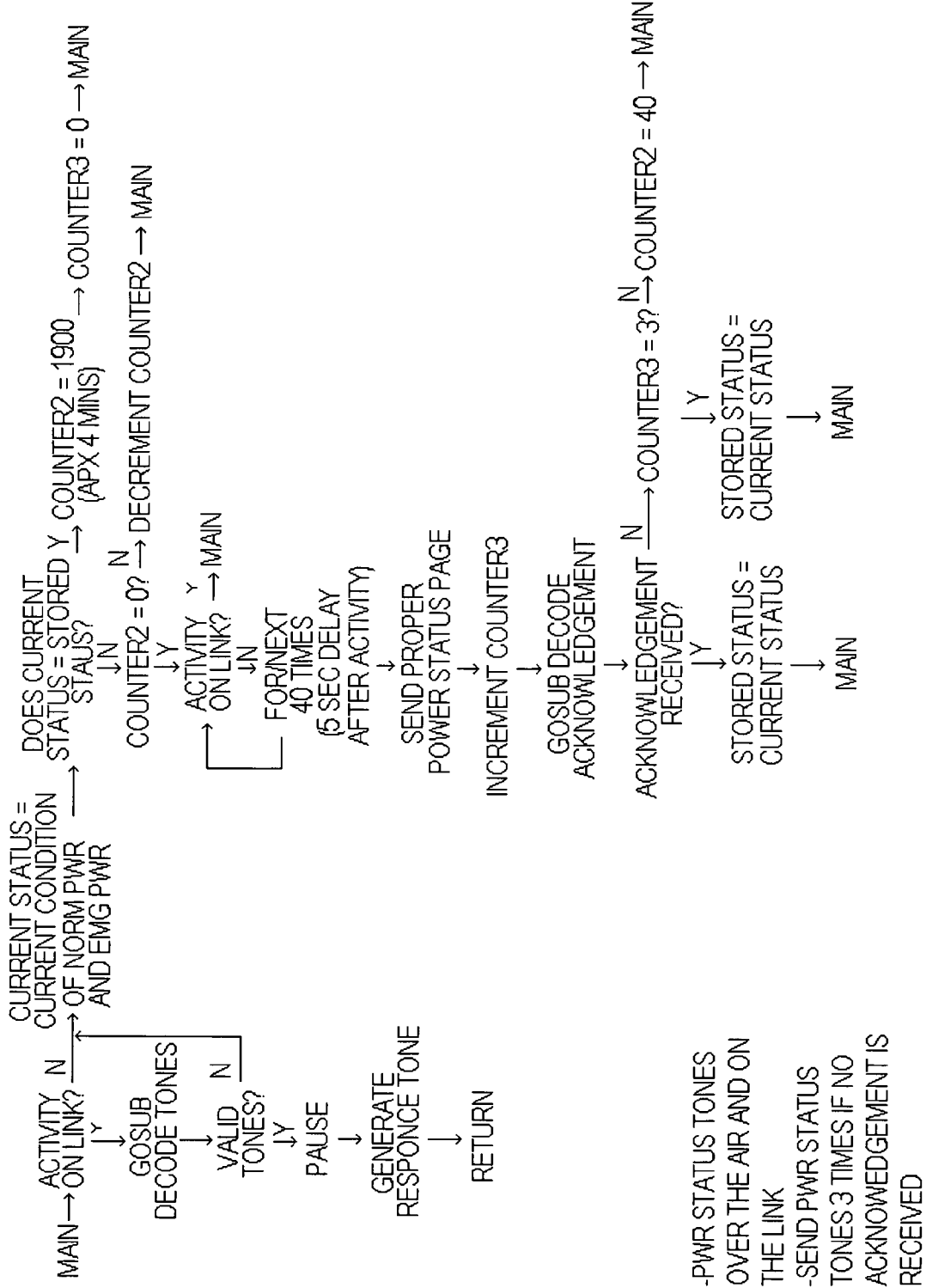
FIG. 8 is a flowchart showing the operation of the computer program product stored in the memory of the microprocessor of the preferred RSU.

The RSU 22 is located at the remote site 13, preferably proximate to the remote base station 16, and is in communication with the base station 16. As shown in the wiring schematic of FIG. 7, the preferred RSU 22 includes its own microprocessor 80 having an internal memory into which a computer program product is stored. The computer program product of the RSU 22 is preferably adapted to perform the steps set forth in the flowchart shown in FIG. 8. Those of skill in the art of communications system programming would readily understand the flowchart of FIG. 8 and, therefore, it is not described in detail herein.

The RSU is in communication with the normal power source for the remote base station 16 through port 82, with the emergency backup power system at the remote base station site through port 84, and with an emergency power transfer module through port 90. The preferred RSU monitors the power status of the base station 16 and sends a signal to the MCU 20 through the base station 16 and monitor radio 18 whenever a change in power occurs; i.e. normal power is interrupted and emergency power is in use, both normal and emergency power are on, etc. The MCU 20 receives this signal, illuminates the appropriate integrity status LED's 71, 72 on the DDU 24 and causes the DDU 24 to produce an audible alarm to alert the dispatcher to the change in power status. In the preferred embodiment, the RSU 22 is also in communication with an intrusion alarm via port 91 at the remote base station and sends a signal to the MCU when the alarm has been triggered. The MCU then sends a signal to the dispatch display unit to produce an audible and/or visual alarm to inform the dispatcher that an intrusion alarm has been triggered at the base station.

The preferred RSU 22 is also used to test the communications link 14 between the dispatch console 12 and the remote base station 16. In such embodiments, if a system test is performed and it is found that there is a failure with both the transmission and reception at the base station, the MCU 22 will transmit a tone through the communications link 14 to the RSU 22. The RSU 22 will receive the tone, identify it as a communications link test tone, and send a response tone back to the MCU 22. It is noted that the remainder of the electrical schematic of FIG. 7 would be readily understood by those of skill in the electrical arts and is not described in further detail herein.

Figure 9A:
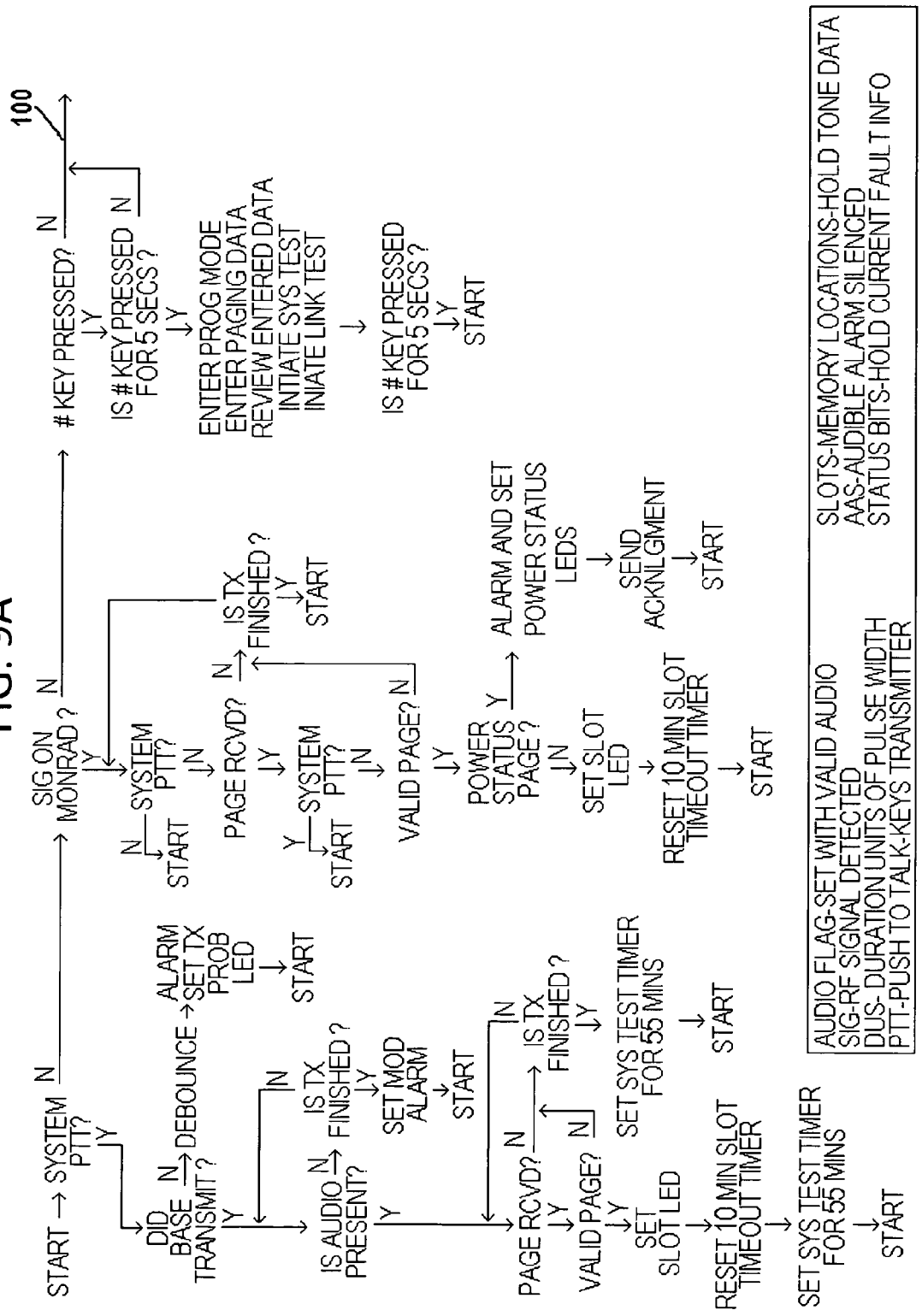
FIG. 9A is a partial flowchart showing the first portion of the steps performed by the system in the method of the present invention.
Figure 9B:
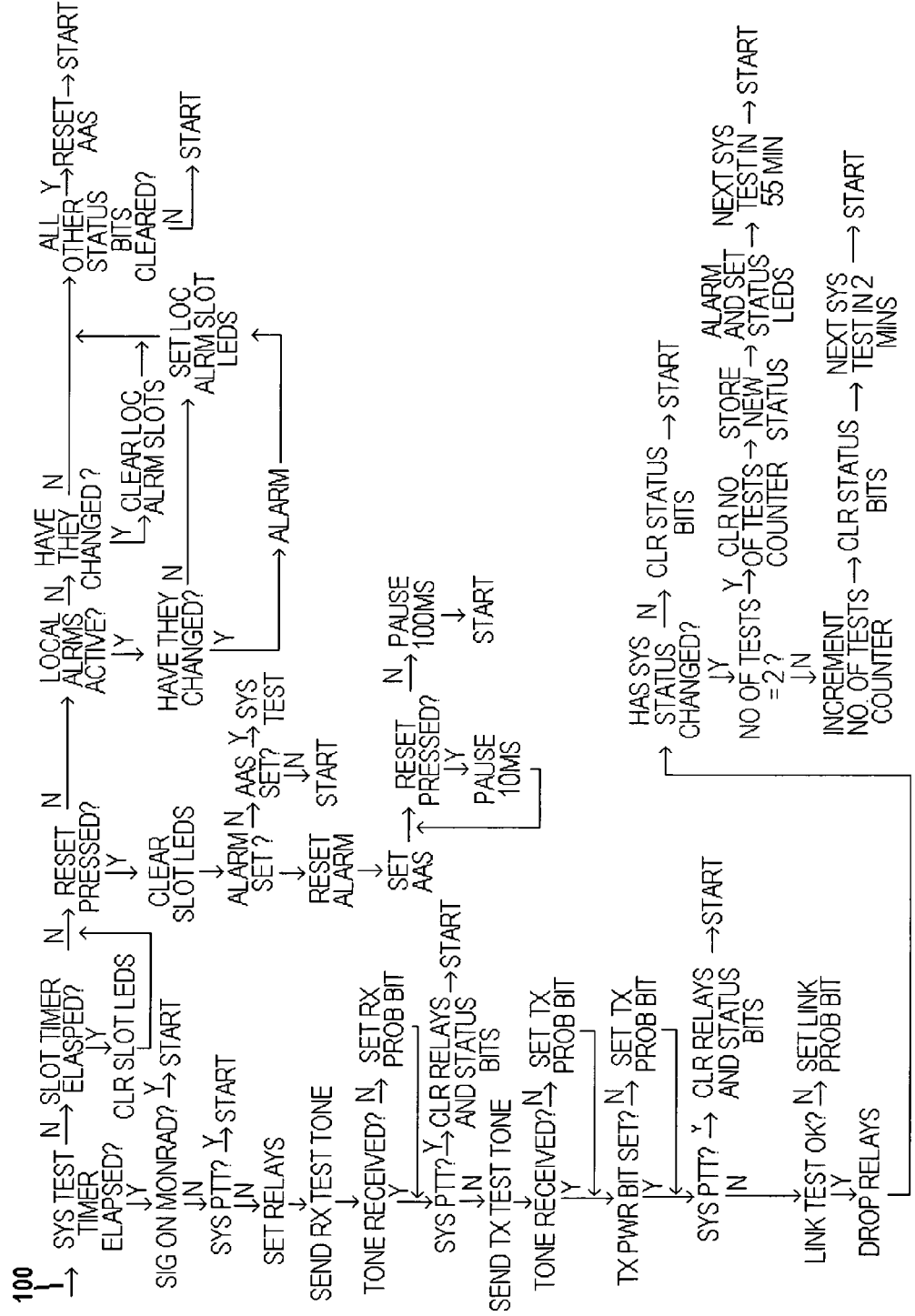
FIG. 9B is a partial flowchart showing the second portion of the steps performed by the system in the method of the present invention.

The preferred method of the present invention is described in the flowcharts of FIGS. 9A and 9B, which each show a portion of the flowchart and may be joined together at common arrow 100. It is preferred that the method be performed by the computer program product stored in the memory of the microprocessor 50 of the MCU 20. However, it is recognized that many of the steps may be performed by a personal computer or other microprocessor based device, in communication with the MCU 20. Therefore, the method should not be seen as being limited to embodiments of the method performed by the MCU 20. Those of skill in the art of communications system programming would readily understand the flowcharts of FIGS. 9A and 9B and, therefore, neither is described in detail herein.

Figure 10A:
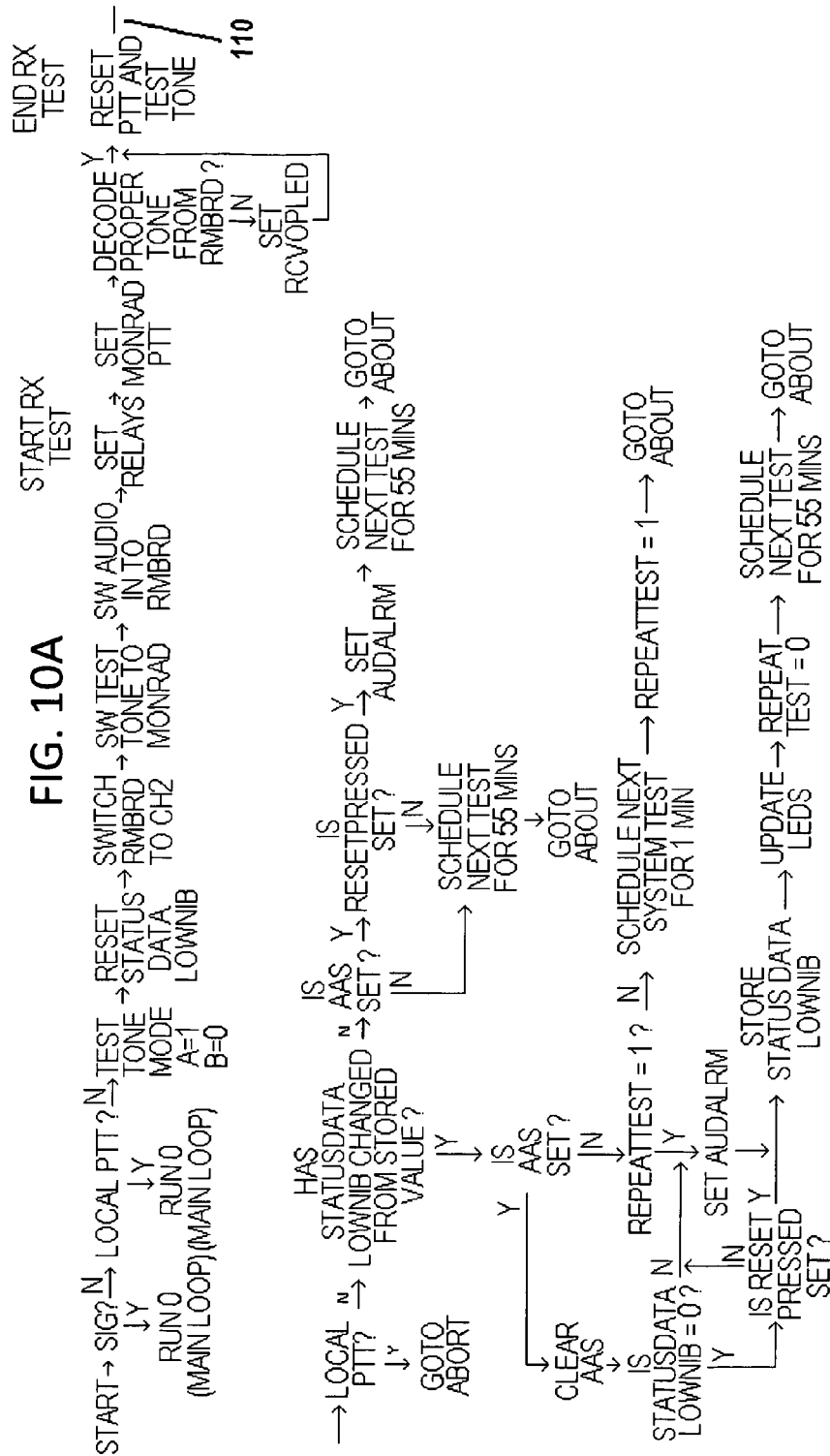
FIG. 10A is a partial flowchart showing the first portion of the steps performed by the system in the testing method of the present invention.
Figure 10B:
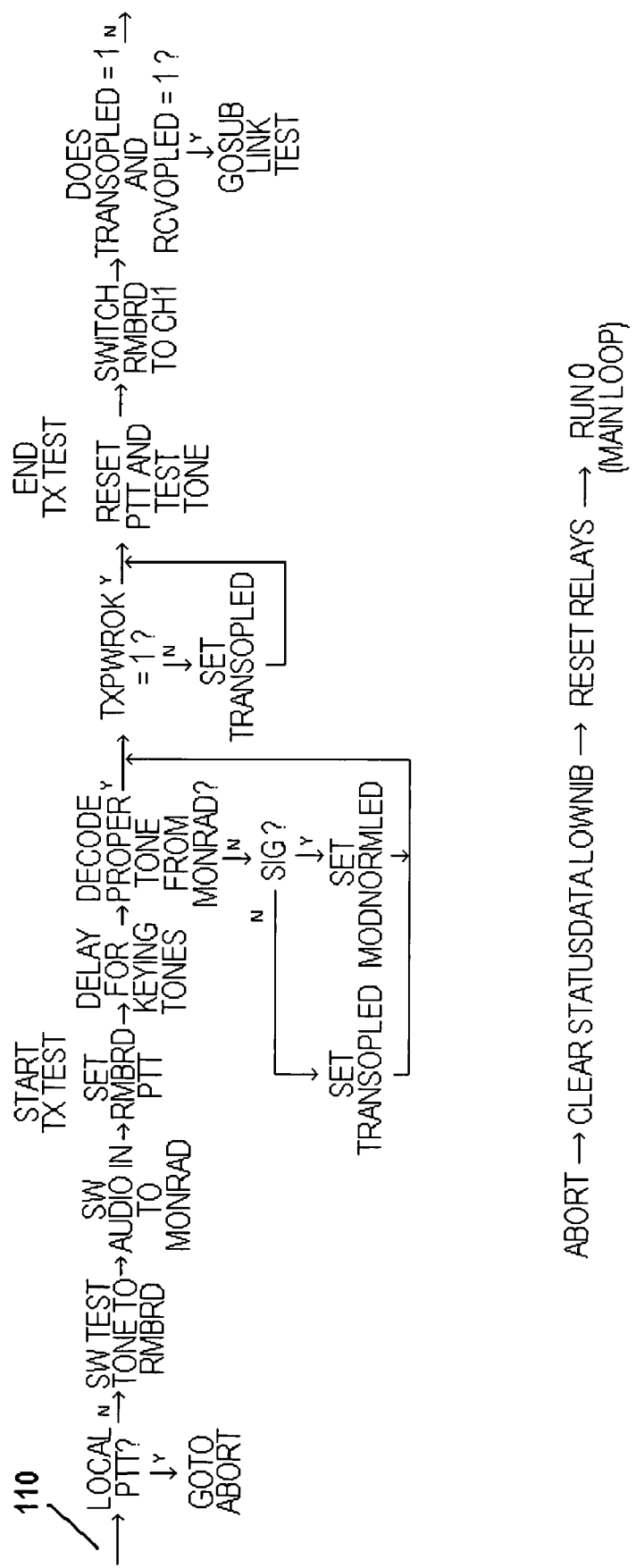
FIG. 10B is a partial flowchart showing the second portion of the steps performed by the system in the testing method of the present invention.
Figure 11:
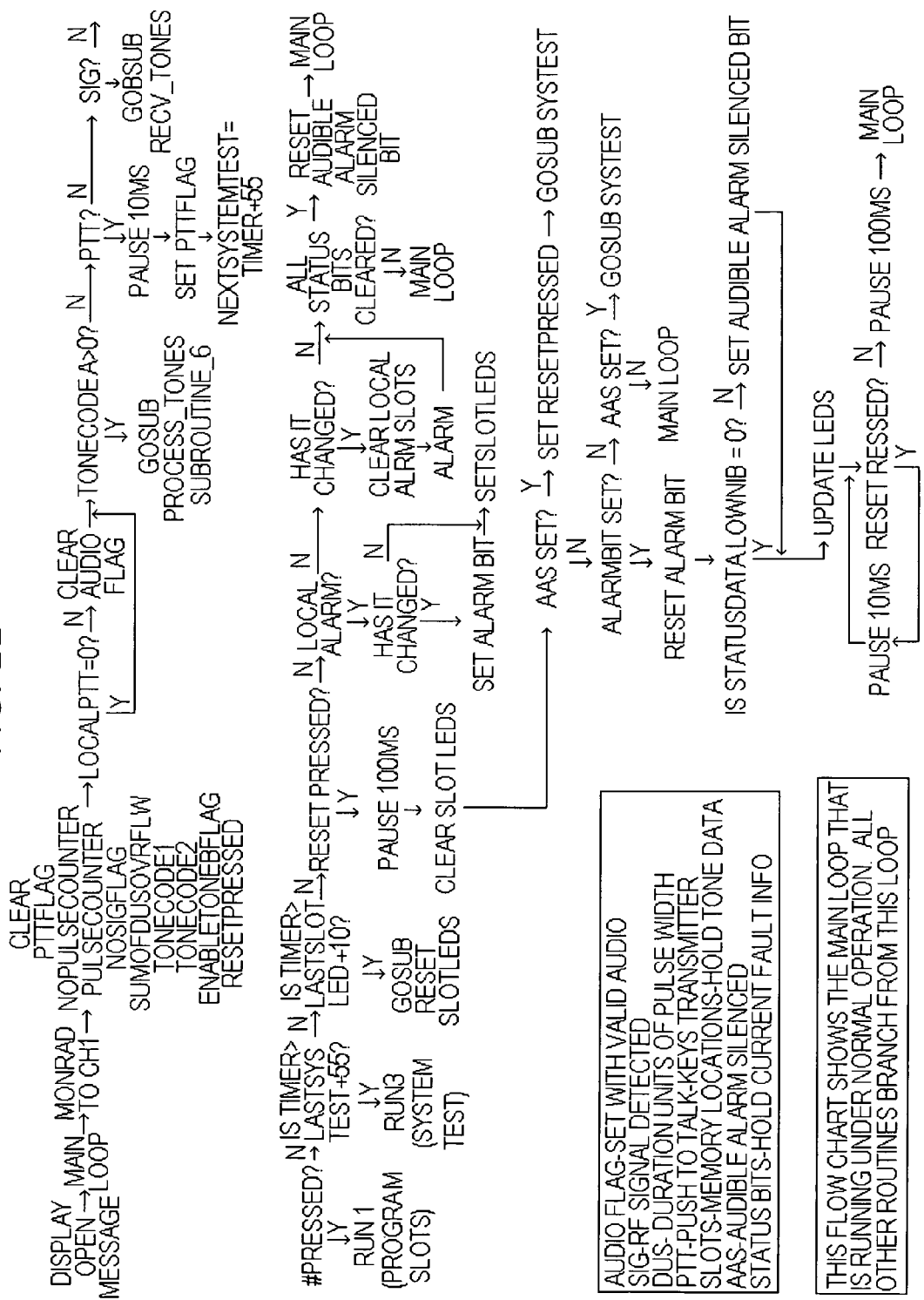
FIG. 11 is a flowchart showing the steps performed by the system in the monitoring method of the present invention.

The test routine performed by the system is part of the preferred method. This test routine is described in the flowcharts of FIGS. 10A and 10B, which each show a portion of the flowchart and may be joined together at common arrow 110. In general, the test includes the steps of determining that it is time to initiate a system test, sending a signal to broadcast a predetermined test tone from a dispatch location to a remote base station, broadcasting the test tone, receiving the tone back at the dispatch location, confirming whether the test tone has been received, and providing an indication of the status of the system. However, the specific implementation of this method in connection with non-trunked analog communications systems requires that a number of other steps be performed, and these steps are set forth in the flowcharts of FIGS. 10A and 10B. As those of skill in the art of communications system programming would readily understand the flowcharts of FIGS. 10A and 10B, neither is described in detail herein.

Referring again to FIG. 2, when the system 10 is adapted for use in connection with repeater type communications systems, the MCU 20 keys the monitor radio 18 and sends a tone to the base station 16, which transmits the code. The code is then received by the control station 15 and decoded by the MCU 20. The MCU 20 then keys the control station 15 and sends a tone to the base station 16 that is received by the monitor radio 18 and is decoded by the MCU 20. If a failure occurs, then the MCU 20 will send a signal to the remote site monitor radio 30 to tell the RSU 22 to key the base station 16 and send a tone to the control station 15 that is decoded by the MCU 20. The MCU 20 will then key the control station 15 transmitter and send a tone to the base station 16, which will be decoded by the RSU 22 and reported back to the MCU 20 via the base station monitor radio 30 to the dispatch monitor radio 18 and on to the MCU 20. If either of these tests fails, then the MCU 20 will key the control station 15 and send a tone to the base station monitor radio 30 that is decoded by the RSU 22 and then reported back to the MCU 20 via the base station monitor radio 30 to the dispatch monitor radio 18 to the MCU 20. The RSU 22 will then send a tone from the base station monitor radio 30 to the control station 15 that is decoded by the MCU 20. This process allows the problem component to be identified and reported.

Figure 14:
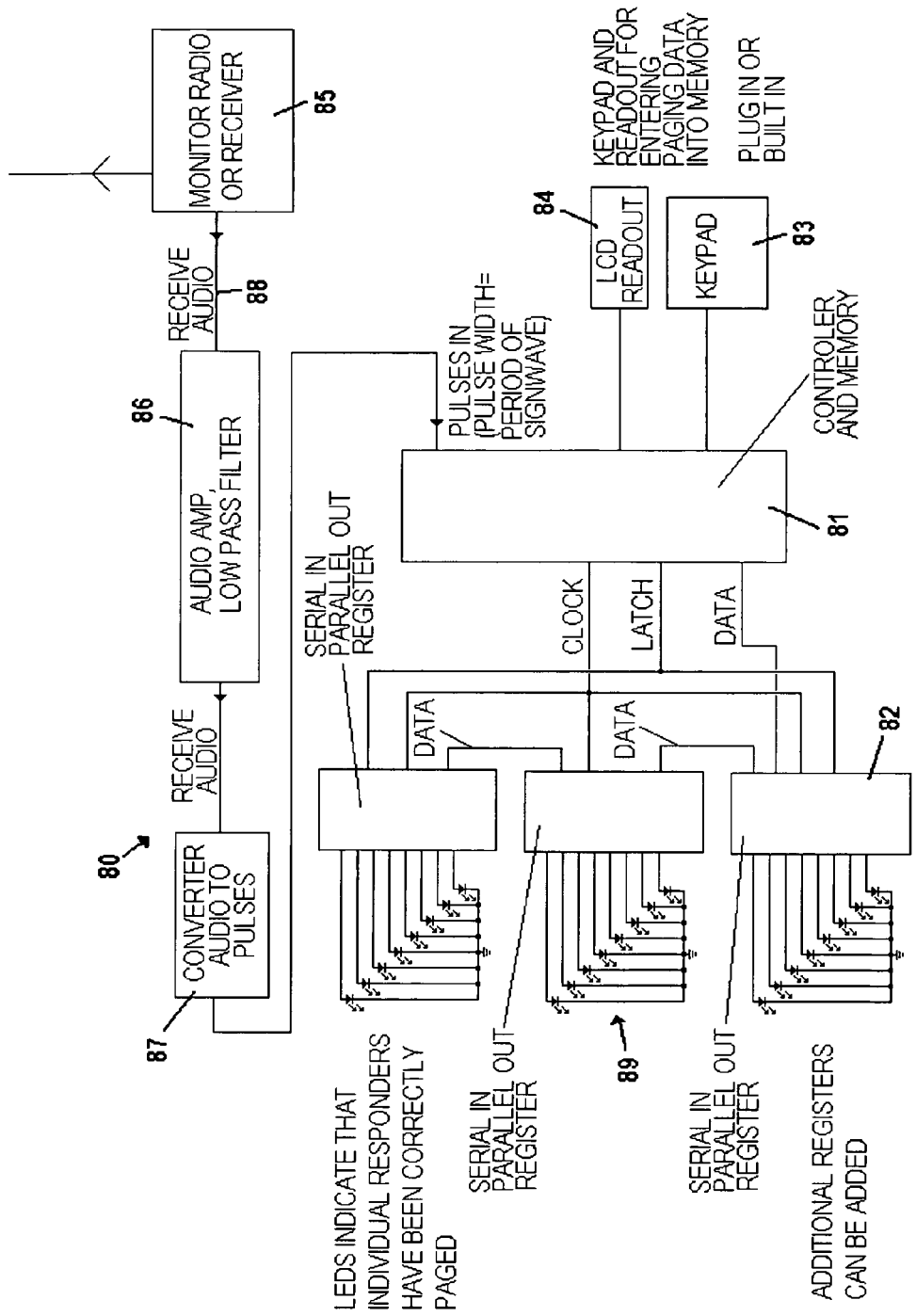
FIG. 14 is a block diagram of the preferred dispatch monitoring and display device of the present invention.

The present invention also encompasses a dispatch monitoring and display device 80 that integrates certain features of the MCU and dispatch display unit, but is used solely for monitoring the transmission of signals to emergency responders and alerting a dispatcher to confirm that a communication has been properly transmitted. The preferred dispatch monitoring and display device 80 is described with reference to FIG. 14.

The preferred dispatch monitoring and display device 80 includes a communications port 88 for receiving signals from a monitor radio 85, an audio amplifier and low pass filter unit 86 that amplifies the signals and filters out any unwanted noise before it passes to the wave to pulse converter 87, which converts the analog signals to digital pulses that may be read by the microprocessor controller 81. The microprocessor controller 81 includes a memory and a computer program product stored in memory that controls the monitoring and display functions of the device, a series of registers 82 that accept information from the microprocessor controller 81, and a plurality of LED's 89, which display information showing that the tone has been transmitted and identifies the emergency responder to which the tone corresponds.

In some embodiments, the dispatch monitoring and display device 80 includes its own monitor radio 85. In such embodiments, the communication port 88 is an internal port that sends signals from the radio portion of the device to the microprocessor 88. Further, although the preferred dispatch monitoring and display device 81 includes a plurality of LED's 89 that operate in a manner similar to that described above with reference to the dispatch display unit 24 of the system of the present invention, in other embodiments, the display is an LCD or other visual display that shows that the tone has been transmitted and identifies the emergency responder to which the tone corresponds. In other embodiments, the dispatch monitoring and display device 81 includes an output that allows the information displayed by the device to be transmitted to another computer system for display and/or storage. Finally, in still other embodiments, the dispatch monitoring and display device 81 includes tone-generating capabilities that allow it to serve as a back-up system for transmitting tones when the console is malfunctioning.

Figure 15:
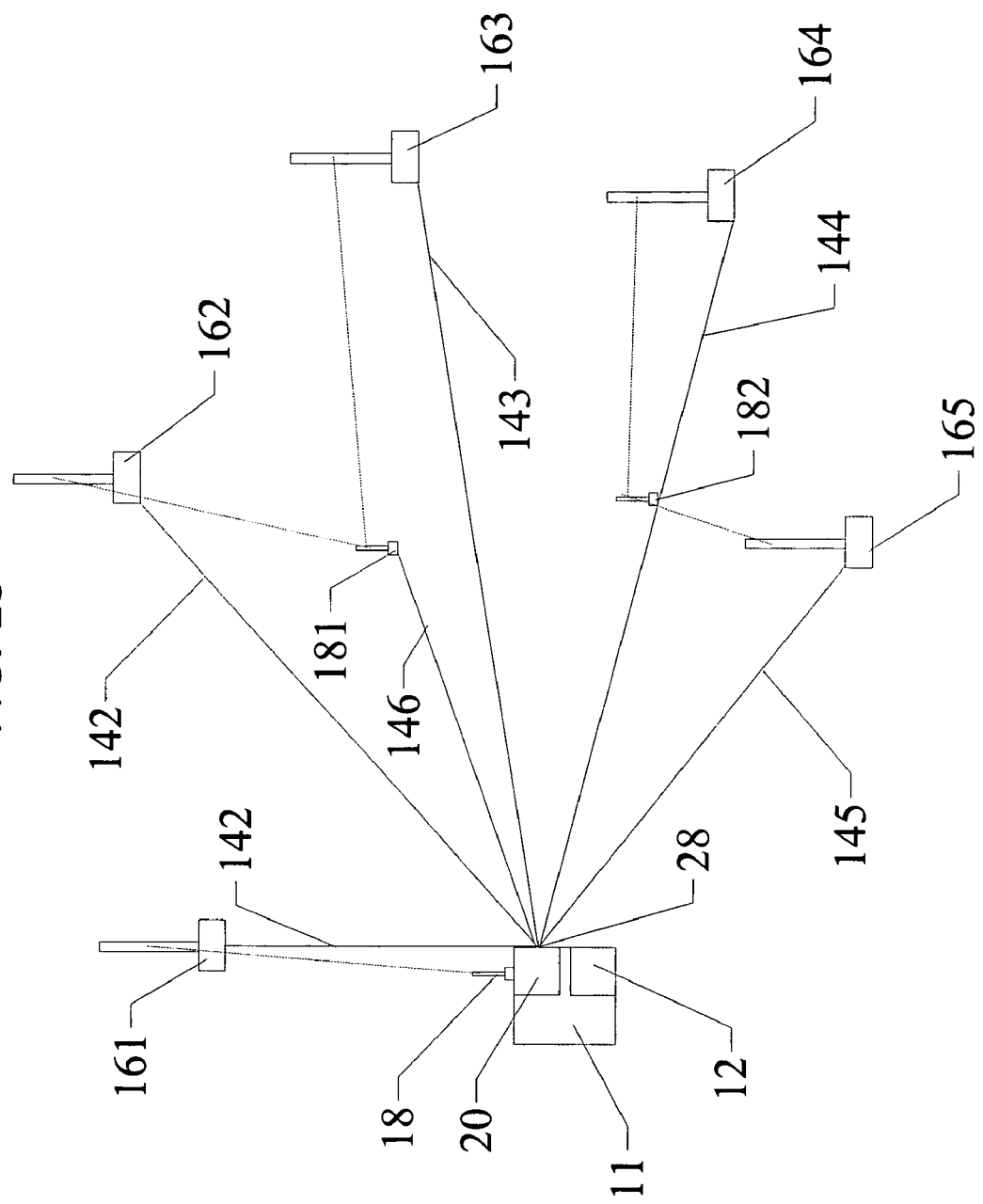
FIG. 15 is a block diagram showing an embodiment of the system of the present invention in which multiple remote monitor radios communication with the MCU and multiple remote base stations.

Referring now to FIG. 15, an embodiment of the system is shown for use in connection with communications systems in which the dispatch center 11 is not located within the transmission range of all remote base stations 161, 162, 163, 164, 165 to which the dispatch center 11 is linked. In these systems, it is preferred that at least one remote monitor radio 181, 182 be mounted at a location remote from the dispatch center 11 that is within the transmission range of at least one remote base station. As shown in FIG. 15, remote monitor radio 181 is within the transmission range of remote base station 162 and remote base station 163, remote monitor radio 182 is within the transmission range of remote base station 164 and remote base station 165, and the dispatch monitor radio 18 is within transmission range of remote base station 161. In the embodiment of FIG. 15, remote monitor radio 182 communicates with the MCU via the same communications link 144 through which the remote base station 164 communicates with the dispatch center 11. However, remote monitor radio 181 communicates with the MCU via a dedicated communications link 146 to the remote base station 164.

It is noted that the embodiment of FIG. 15 is intended to illustrate the adaptation of the system of the present invention to one communication system and is not intended to limit systems with multiple monitor radios to the system disclosed in FIG. 15. For example, remote monitor radios may be mounted in a plurality of different locations and the base station monitor radios located at some remote base stations may serve the same purpose.

Although the present invention has been described in considerable detail with reference to certain preferred versions thereof, other versions would be readily apparent to those of ordinary skill in the art. Therefore, the spirit and scope of the appended claims should not be limited to the description of the preferred versions contained herein.

What is claimed is:

1. A testing system for a dispatch system that comprises a dispatch console and a remote base station comprising a communication link with the dispatch console and a radio transmitter, said testing system comprising:
    at least one monitor radio comprising a radio receiver configured to receive radio signals from the radio transmitter of the base station, at least one radio communications input and at least one radio communications output;
    a dispatch display unit comprising at least one visual display for displaying a status of said dispatch system and at least one display communications input; and
    a master control unit comprising;
        a radio control communications output in communication with said at least one radio communications input of said at least one monitor radio and a radio control communications input in communication with said at least one radio communications output of said at least one monitor radio;
        a display control communications output in communication with said at least one display communications input of said dispatch display unit;
        a console control communications output and a console control communications input in communication with the dispatch console of the dispatch system;
        a microprocessor in communication with said radio control communications output, said radio control communications input, said display control communications output, said console control communications output and said console control communications input;
        a memory; and
        computer program means, stored in said memory, for controlling said testing system, wherein said computer program means comprises transmission testing means comprising;
            transmission test initiation means for determining when a transmission test of the dispatch system is to be performed and for initiating said transmission test;
            transmission tone sending means for sending a signal corresponding to a predetermined transmission test tone through said console control communications output, to the dispatch console and through the communications link to the remote base station;
            transmission tone receiving means for receiving a signal corresponding to said transmission test tone from at least one of said at least one monitor radio through said radio control communications input;
            transmission tone confirmation means for confirming whether said transmission test tone has been received; and
            transmission display output means for sending a signal corresponding to whether said transmission test tone has been received to said dispatch display unit through said display control communications output.

2. The testing system as claimed in claim 1;
    wherein said transmission test initiation means comprises means for initiating a first transmission test at a predetermined time interval and means for initiating at least one additional transmission test based upon whether a test tone sent in a prior test has been received;
    wherein said display output means comprises means for sending a first signal when said test tone has been received and for sending a second signal when a test tone from an additional test has not been received; and
    wherein said dispatch display unit further comprises signal processing means for determining whether a signal received through said at least one display communications input is said first signal or said second signal and for controlling at least one of said at least one visual display based upon whether said first signal or said second signal has been received by said dispatch display unit.

3. The testing system as claimed in claim 1;
    wherein the remote base station further comprises a radio receiver;
    wherein said at least one monitor radio further comprises a radio transmitter; and
    wherein said computer program means of said master control unit further comprises reception testing means comprising;
    reception test initiation means for determining when a base station reception test is to be performed and for initiating said test;
    reception tone sending means for sending a signal corresponding to a predetermined reception test tone through said radio transmitter of said at least one monitor radio to the radio receiver of the remote base station;
    reception tone receiving means for receiving a signal corresponding to said reception test tone from said base station through the communications link, dispatch console and console control communications input;
    reception tone confirmation means for confirming whether said reception test tone has been received; and
    reception display output means for sending a signal corresponding to whether said reception test tone has been received to said dispatch display unit through said display control communications output.

4. The testing system as claimed in claim 3;
    wherein said reception test initiation means comprises means for initiating a first reception test at a predetermined time interval and means for initiating at least one additional reception test based upon whether a reception test tone sent in a prior reception test has been received;
    wherein said display output means comprises means for sending a first signal when said reception test tone has been received and for sending a second signal when a reception test tone from an additional reception test has not been received; and
    wherein said dispatch display unit further comprises signal processing means for determining whether a signal received through said at least one display communications input is said first signal or said second signal and for controlling at least one of said at least one visual display based upon whether said first signal or said second signal has been received by said dispatch display unit.

5. The testing system as claimed in claim 3 wherein said at least one visual display of said dispatch display unit comprises a transmission status display and a reception status display.

6. The testing system as claimed in claim 3;
wherein said master control unit further comprises communication monitoring means for monitoring communications through the dispatch system;
wherein said computer program means of said master control unit further comprises communication recognition means for recognizing when one of tone communications and voice communications are sent through the dispatch system; and
wherein said master control unit further test termination means for terminating a transmission test or a reception test when said communication recognition means recognizes that one of tone communication and voice communications have been sent through the dispatch system.

7. The testing system as claimed in claim 6;
wherein said transmission test initiation means further comprises means for reinitiating said transmission test at a predetermined time after a prior transmission test has been terminated; and
wherein said reception test initiation means further comprises means for reinitiating said reception test at a predetermined time after a prior reception test has been terminated.

8. The testing system as claimed in claim 6 wherein said test termination means of said master control unit comprises at least one relay in communication with said microprocessor and adapted to immediately terminate a transmission by said master control unit when said communication recognition means recognizes that tone or voice communications have been sent through the dispatch system.

9. The testing system as claimed in claim 3 wherein the dispatch system further comprises an emergency backup power system in communication with the remote base station;
wherein said testing system further comprises a remote site unit comprising;
a remote base station communications input in communication with the base station;
an emergency backup power system communications input in communication with the emergency backup power system,
a master control unit communications output in communication with said master control unit through the communications link and the display console;
a microprocessor;
a memory;
remote site unit computer program means, stored in said memory, for monitoring and testing said emergency backup power system and said remote base station, wherein said computer program means comprises a power monitoring means for monitoring a power status of the remote base station; and
power change output means for sending a power status signal to said master control unit corresponding to a power status of said base station whenever a change in said power status of said the remote base station occurs;
wherein said computer program means of said master control unit further comprises power change alarm means comprising:
power change signal receiving means for receiving said power status signal from said remote site unit;
power status signal decoding means for determining a power status of said remote base station based upon said power status signal received by said master control unit; and
power status display output means for sending a power status signal corresponding to a power status signal received by said master control unit to said dispatch display unit through said display control communications output; and
wherein said dispatch display unit further comprises at least one power status display and processing means for receiving and processing said power status signal and controlling said at least one of said at least one power status display based upon said power status signal.

10. The testing system as claimed in claim 9;
wherein said computer program means of said master control unit further comprises communication link testing means comprising:
test failure recognition means for recognizing when one of a transmission test and reception test has resulted in a test failure;
communication link test tone sending means for sending a signal corresponding to a predetermined communication link test tone through said console control communications output, to the dispatch console and through the communications link to the remote site unit;
communication link test tone receiving means for receiving a signal corresponding to said communication link test tone from said remote site unit through communication link, said dispatch console and said console control communications input;
communication link test tone confirmation means for confirming whether said communication link test tone has been received; and
communication link display output means for sending a signal corresponding to whether said communication link test tone test tone has been received to said dispatch display unit through said display control communications output; and
wherein said remote site computer program means further comprises communication link test means comprising;
communication link test tone receiving means for receiving a signal corresponding to said communication link test tone from said master control unit through the dispatch console and the communication link;
communication link test tone recognition means for recognizing when said a tone received through said communication link is a communication link test tone; and
communication link test tone output means for sending a signal corresponding to whether said communication link test tone test tone has been received to said master control unit through said communication link and said dispatch console.

11. The testing system as claimed in claim 10 wherein said remote site unit further comprises a base station monitor radio transceiver, and wherein said communication link is a dispatch transmitter in radio communication with the dispatch console, said master control unit, the remote base station, and said base station monitor radio transceiver of said remote site unit.

12. The testing system as claimed in claim 1;
wherein said master control unit further comprises dispatch tone data stored in said memory, said dispatch tone data comprising data corresponding to a plurality of dispatch tones and a responder assigned to each of said plurality of dispatch tones;

wherein said at least one visual display of said dispatch display unit comprises at least one dispatch status display;

wherein said computer program means of said master control unit further comprises dispatch monitoring means comprising:

dispatch tone receiving means for receiving a signal corresponding to one of said plurality of dispatch tones from at least one of said at least one monitor radio through said radio control communications input;

dispatch tone decoding means for comparing said signal with said plurality of dispatch tones to determine which responder is assigned to said dispatch tone received by said master control unit; and dispatch display output means for sending a signal corresponding to a responder assigned to said dispatch tone received by said master control unit to said dispatch display unit through said display control communications output; and wherein said dispatch display unit further comprises processing means for receiving and processing said signal and controlling one of said at least one dispatch status display based upon said signal.

13. The testing system as claimed in claim 12 wherein said master control unit further comprises;

communication monitoring means for monitoring communications between the dispatch console and the remote base station;

push to talk recognition means for recognizing when a push to talk command has been communicated between the dispatch console and the remote base station;

transmission verification means for verifying that a transmission is received through one of said at least one monitor radio within a predetermined time period after said push to talk recognition means recognizes that said push to talk command has been communicated; and system failure output means for sending a system failure signal to said dispatch display unit through said display control communications output if said transmission is not received through one of said at least one monitor radio within said predetermined time period.

14. The testing system as claimed in claim 1 wherein said at least one visual display of said dispatch display unit comprise a plurality of light emitting diodes and wherein said dispatch display unit further comprises an audible alarm.

15. The testing system as claimed in claim 14 wherein said plurality of light emitting diodes comprise a first plurality of light emitting diodes correspond to a plurality of responders and a second plurality of light emitting diodes corresponding to a tested status of said dispatch system.

16. The testing system as claimed in claim 1;

wherein the dispatch system that comprises a first remote base station comprising a communication link with the dispatch console and a radio transmitter, and a second remote base station comprising a communication link with the dispatch console and a radio transmitter;

wherein said at least one monitor radio comprises a first monitor radio and a second monitor radio;

wherein said first monitor radio is in radio communication with said radio transmitter of said first remote base station and said second monitor radio is in radio communication with said radio transmitter of said second remote base station; and wherein said first monitor radio and said second monitor radio are each in communication with said master control unit.

17. A testing system for a dispatch system that comprises a dispatch console and a remote base station comprising a communication link with the dispatch console and a radio transmitter, said testing system comprising:

a dispatch monitor radio comprising a radio receiver configured to receive radio signals from the radio transmitter of the base station, at least one radio communications input and at least one radio communications output;

a dispatch display unit comprising at least one visual display for displaying a status of said dispatch system and at least one display communications input; and a master control unit comprising;

a radio control communications output in communication with said at least one radio communications input of said dispatch monitor radio and a radio control communications input in communication with said at least one radio communications output of said dispatch monitor radio;

a display control communications output in communication with said at least one display communications input of said dispatch display unit;

a console control communications output and a console control communications input in communication with the dispatch console of the dispatch system;

a microprocessor in communication with said radio control communications output, said radio control communications input, said display control communications output, said console control communications output and said console control communications input;

a memory; and computer program means, stored in said memory, for controlling said testing system, wherein said computer program means comprises transmission testing means comprising;

transmission test initiation means for determining when a transmission test of the dispatch system is to be performed and for initiating said transmission test;

transmission tone sending means for sending a signal corresponding to a predetermined transmission test tone through said console control communications output, to the dispatch console and through the communications link to the remote base station;

transmission tone receiving means for receiving a signal corresponding to said transmission test tone from said dispatch monitor radio through said radio control communications input;

transmission tone confirmation means for confirming whether said transmission test tone has been received; and transmission display output means for sending a signal corresponding to whether said transmission test tone has been received to said dispatch display unit through said display control communications output.

18. A dispatch monitoring and display device for use with a dispatch center having a monitor radio, said device comprising:

a communications port for receiving signals from the monitor radio;

a microprocessor;

a memory;

computer program means, stored in said memory, for controlling monitoring and display functions of said device;

at least one visual display that displays information showing that a tone has been transmitted and identifies a emergency responder to which said tone corresponds, and dispatch tone data stored in said memory, said dispatch tone data comprising data corresponding to a plurality of dispatch tones and a responder assigned to each of said plurality of dispatch tones;

wherein said at least one visual display comprises at least one dispatch status display;

wherein said computer program means comprises dispatch monitoring means for monitoring dispatch tones and identifying responders corresponding to said dispatch tones, said dispatch monitoring means comprising:

dispatch tone receiving means for receiving a signal corresponding to one of said plurality of dispatch tones from the monitor radio through said communications port;

dispatch tone decoding means for comparing said signal with said plurality of dispatch tones to determine which responder is assigned to said dispatch tone received by said device; and dispatch display output means for controlling one of said at least one dispatch status display based upon said signal.

19. The dispatch monitoring and display device as claimed in claim 18 wherein the monitor radio of the dispatch center is integral to said dispatch monitoring and display device, and wherein said communication port is an internal port that sends signals from said integral monitor radio directly to said microprocessor.

20. The dispatch monitoring and display device as claimed in claim 18 wherein said at least one visual display of said dispatch display unit comprise a plurality of light emitting diodes corresponding to a plurality of responders and wherein said dispatch display unit further comprises an audible alarm.

* * * * *